United States Patent
John et al.

(10) Patent No.: US 11,360,214 B2
(45) Date of Patent: Jun. 14, 2022

(54) TECHNIQUES FOR GHOSTING MITIGATION IN COHERENT LIDAR SYSTEMS

(71) Applicant: AEVA, INC., Mountain View, CA (US)

(72) Inventors: Esha John, Sunnyvale, CA (US); Jose Krause Perin, Mountain View, CA (US); Kumar Bhargav Viswanatha, Santa Clara, CA (US); Rajendra Tushar Moorti, Mountain View, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/495,692

(22) Filed: Oct. 6, 2021

(65) Prior Publication Data
US 2022/0113412 A1 Apr. 14, 2022

Related U.S. Application Data

(60) Provisional application No. 63/089,178, filed on Oct. 8, 2020.

(51) Int. Cl.
*G01C 3/08* (2006.01)
*G01S 17/10* (2020.01)
(Continued)

(52) U.S. Cl.
CPC ............ *G01S 17/10* (2013.01); *G01S 7/4865* (2013.01); *G01S 7/4873* (2013.01); *G01S 7/493* (2013.01)

(58) Field of Classification Search
None
See application file for complete search history.

(56) References Cited

U.S. PATENT DOCUMENTS

2019/0310372 A1 10/2019 Crouch et al.
2020/0200904 A1* 6/2020 Singer .................. B60W 30/18
(Continued)

FOREIGN PATENT DOCUMENTS

WO WO 2020018805 A1 * 1/2020 ............. G01S 17/34
WO 2020028146 A1 2/2020

OTHER PUBLICATIONS

International Search Report and Written Opinion on the Patentability of Application No. PCT/US2021/054013 dated Jan. 20, 2022, 13 pages.

*Primary Examiner* — Mark Hellner
(74) *Attorney, Agent, or Firm* — Womble Bond Dickinson (US) LLP

(57) ABSTRACT

A light detection and ranging (LIDAR) system to transmit optical beams including at least up-chirp frequency and at least one down-chirp frequency toward targets in a field of view of the LIDAR system and receive returned signals of the up-chirp and the down-chirp as reflected from the targets. The LIDAR system generates a baseband signal in a frequency domain of the returned signals of the at least one up-chirp frequency and the at least one down-chirp frequency. The baseband signal includes a first set of peaks associated with the at least the at least one up-chirp frequency and a second set of peaks associated with the at least one down-chirp frequency. The LIDAR system determines the target location using the first set of peaks and the second set of peaks.

20 Claims, 14 Drawing Sheets

(51) Int. Cl.
    *G01S 7/493* (2006.01)
    *G01S 7/487* (2006.01)
    *G01S 7/4865* (2020.01)

(56) References Cited

U.S. PATENT DOCUMENTS

2020/0217935 A1    7/2020  Angus et al.
2022/0011417 A1*   1/2022  Hao .................... G01S 7/4917

* cited by examiner

TECHNIQUES FOR GHOSTING MITIGATION IN COHERENT LIDAR SYSTEMS

RELATED APPLICATIONS

This application claims priority from and the benefit of U.S. Provisional Patent Application No. 63/089,178 filed on Oct. 8, 2020, the entire contents of which are incorporated herein by reference in their entirety.

FIELD

The present disclosure is related to LIDAR (light detection and ranging) systems in general, and more particularly to ghosting mitigation in coherent LIDAR systems.

BACKGROUND

LIDAR systems, such as frequency-modulated continuous-wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal (e.g., a returned signal), delayed by the round-trip time to the target and back, generates signals at the receiver with frequencies that are proportional to the distance to each target in the field of view of the system. An up sweep of frequency and a down sweep of frequency may be used to detect a range and velocity of a detected target. However, when one or more of the LIDAR system and a target (or multiple targets) are moving, the issue of associating the peaks corresponding to each target arises.

SUMMARY

The present disclosure describes examples of systems and methods for automatically adjusting a detection threshold for target detection.

According to one aspect, the present disclosure relates to a method. The method includes transmitting, toward a target in a field of view of a light detection and ranging (LIDAR) system, one or more optical beams comprising at least one up-chirp frequency and at least one down-chirp frequency; receiving, from the target, one or more returned signals based on the one or more optical beams, wherein the one or more returned signals includes an adjusted up-chirp frequency shifted from the at least one up-chirp frequency caused by a relative motion of at least one of the target and the LIDAR system, and an adjusted down-chirp frequency shifted from the at least one down-chirp frequency caused by the relative motion of at least one of the target and the LIDAR system, the adjusted up-chirp frequency and the adjusted down-chirp frequency producing a first set of peaks associated with the at least one up-chirp frequency corresponding to a target location of the target and a second set of peaks associated with the at least one down-chirp frequency corresponding to the target location; and determining the target location using the first set of peaks and the second set of peaks.

In an embodiment, determining the target location further includes calculating a first set of frequency bins surrounding a first peak associated with the first set of peaks; calculating a second set of frequency bins surrounding a second peak associated with the first set of peaks based on the second set of frequency bins comprising negative frequency values that correspond to positive frequency values associated with the first set of frequency bins, wherein the second peak is conjugate symmetric to the first peak; calculating a third set of frequency bins surrounding a third peak associated with the second set of peaks; calculating a fourth set of frequency bins surrounding a fourth peak associated with the second set of peaks based on a fourth set of frequency bins comprising negative frequency values that correspond to positive frequency values associated with the third set of frequency bins, wherein the fourth peak is conjugate symmetric to the third peak.

In an embodiment, the method further includes: provided the first peak or the third peak is within a maximum Doppler shift relative to a minimum detectable frequency set for the LIDAR system: selecting, from the first peak and the third peak, a true peak value corresponding to the target location based on a highest frequency comprising a positive frequency value; provided the first peak is the true peak value: computing a first target range estimate based on the first peak and the third peak and using the first target range estimate and phase non-linearities in the one or more optical beams to determine a first peak shape estimate; computing a second target range estimate based on the first peak and the fourth peak and using the second target range estimate and the phase non-linearities to determine a second peak shape estimate; comparing the first peak shape estimate and the second peak shape estimate to the third peak and the fourth peak; provided the first peak shape estimate and the third peak produce a higher correlation than the second peak shape estimate and the fourth peak, determining the third peak to correspond to the target location; and provided the second peak shape estimate and the fourth peak produce a higher correlation than the first peak shape estimate and the third peak, determining the fourth peak to correspond to the target location.

In an embodiment, the method further includes: provided the third peak is the true peak value: computing a first target range estimate based on the first peak and the third peak and using the first target range estimate and phase non-linearities in the one or more optical beams to determine a third peak shape estimate; computing a second target range estimate based on the second peak and the third peak and using the second target range estimate and the phase non-linearities to determine a fourth peak shape estimate; comparing the third peak shape estimate and the fourth peak shape estimate to the first peak and the second peak; provided the third peak shape estimate and the first peak produce a higher correlation than the fourth peak shape estimate and the second peak, determining the first peak to correspond to the target location; and provided the fourth peak shape estimate and the second peak produce a higher correlation than the third peak shape estimate and the first peak, determining the second peak to correspond to the target location.

In an embodiment, comparing the first peak shape estimate and the second peak shape estimate further includes: comparing the first peak shape estimate to the third peak and comparing the second peak shape estimate to the fourth peak.

In an embodiment, determine whether the first peak shape estimate matches the third peak further includes: correlating the first peak shape estimate and the third peak to produce a correlation and determining whether the correlation exceeds a predetermined threshold.

In an embodiment, the method further includes: provided the first peak or the third peak is within a maximum Doppler shift relative to a Nyquist frequency: selecting, from the first peak and the third peak, a true peak value corresponding to the target location based on a lowest frequency comprising a positive frequency value; provided the first peak is the true peak value: computing a first target range estimate based on the first peak and the third peak and using the first target range estimate and phase non-linearities in the one or more optical beams to determine a first peak shape estimate; computing a second target range estimate based on the first peak and the fourth peak and using the second target range estimate and the phase non-linearities to determine a second peak shape estimate; comparing the first peak shape estimate and the second peak shape estimate to the third peak and the fourth peak respectively; provided the first peak shape estimate and the third peak produce a higher correlation than the second peak shape estimate and the fourth peak, determining the third peak to correspond to the target location; and provided the second peak shape estimate and the fourth peak produce a higher correlation than the first peak shape estimate and the third peak, determining the fourth peak to correspond to the target location, wherein the true peak is set to a combination of the Nyquist frequency and a frequency corresponding to the fourth peak.

In an embodiment, the method further includes: provided a maximum negative Doppler shift threshold is set for the LIDAR system: mapping a minimum distance threshold of the LIDAR system to the maximum negative Doppler shift threshold wherein positive frequency value peaks among the first and second set of peaks are established as one or more true peaks to predict the target location.

In an embodiment, mapping a minimum distance further includes: adding an optical delay to a receive path of the LIDAR system to map the minimum distance threshold to a maximum negative Doppler shift frequency.

In an embodiment, the method further includes: provided a Doppler shift between the LIDAR system and the target is predetermined: selecting a true peak corresponding to the target location based on the first set of peaks.

In an embodiment, the method further includes: provided a maximum positive Doppler shift threshold is set for the LIDAR system: mapping a maximum distance threshold of the LIDAR system to the maximum positive Doppler shift threshold to adjust a chirp rate of one or more optical beams to prevent aliasing of one or more peaks such that positive frequency value peaks among both the first and second set of peaks are established as one or more true peaks to predict the target location.

In an embodiment, mapping a maximum distance threshold further includes: adjusting a chirp rate of one or more optical beams based on a Nyquist frequency and the maximum distance threshold.

In an embodiment, the method further includes: provided the first peak or the third peak is within a maximum Doppler shift relative to a minimum detectable frequency set for the Lidar system: provided a Doppler shift between the LIDAR system and the target is predetermined producing a predetermined Doppler shift: selecting, from the first peak and the third peak, a first true peak location corresponding to the target location based on a highest frequency comprising a positive frequency value; provided the first peak is selected as the first true peak location: estimating a second true peak location based on the predetermined Doppler shift and the first peak; and determining a target location based on a selection between the third peak and the fourth peak based on a proximity with the second true peak location; provided the third peak is selected as the first true peak location: estimating the second true peak location based on the predetermined Doppler shift and the third peak; and determining a target location based on a selection between the second peak and the first peak based on a proximity with the second true peak location.

In an embodiment, the predetermined Doppler shift is selected based on at least one of ego-velocity, previous frame information, and neighboring points information.

In an embodiment, the method further includes: provided the first peak or the third peak is within a maximum Doppler shift relative to a Nyquist frequency: provided a Doppler shift between the LIDAR system and the target is predetermined producing a predetermined Doppler shift: selecting, from the first peak and the third peak, a first true peak location corresponding to the target location based on a lowest frequency comprising a positive frequency value; provided the first peak is selected as the first true peak location: estimating a second true peak location based on the predetermined Doppler shift, the first peak, and a Nyquist frequency; and determining a target location based on a selection between the third peak and the fourth peak based on a proximity with the second true peak location; provided the third peak is selected as the first true peak location: estimating the second true peak location based on the predetermined Doppler shift and the third peak, and the Nyquist frequency; and determining the target location based on the selection between the second peak and the first peak based on a proximity with the second true peak location.

In an embodiment, the method further includes generating a baseband signal in a frequency domain by mixing the at least one up-chirp frequency and the at least one down-chirp frequency with the one or more returned signals, wherein the at least one down-chirp frequency is delayed in time proportional to the relative motion.

In an embodiment, the baseband signal includes the first set of peaks and the second set of peaks.

According to one aspect, the present disclosure relates to a light detection and ranging (LIDAR) system. The LIDAR system includes an optical scanner to transmit one or more optical beams comprising at least one up-chirp frequency and at least one down-chirp frequency toward a targets in a field of view of the LIDAR system and receive one or more returned signals based on the one or more optical beams, wherein the one or more returned signals comprises an adjusted up-chirp frequency shifted from the at least one up-chirp frequency caused by a relative motion of at least one of the target and the LIDAR system, and an adjusted down-chirp frequency shifted from the at least one down-chirp frequency caused by the relative motion of at least one of the target and the LIDAR system, the adjusted up-chirp frequency and the adjusted down-chirp frequency producing a first set of peaks associated with the at least one up-chirp frequency corresponding to a target location of the target and a second set of peaks associated with the at least one down-chirp frequency corresponding to the target location; an optical processing system coupled to the optical scanner to generate a baseband signal in a time domain from the return signal, the baseband signal comprising frequencies corresponding to LIDAR target ranges; and a signal processing system coupled to the optical processing system, comprising: a processing device; and a memory to store instructions that, when executed by the processing device, cause the LIDAR system to: determine the target location using the first set of peaks and the second set of peaks.

According to one aspect, the present disclosure relates to a non-transitory computer-readable medium containing instructions that, when executed by a processor in a (light detection and ranging) LIDAR system, cause the LIDAR system to: transmit, toward a target in a field of view of the LIDAR system, one or more optical beams comprising at least one up-chirp frequency and at least one down-chirp frequency; receive, from the target, one or more returned signals based on the one or more optical beams, wherein the one or more returned signals comprises an adjusted up-chirp frequency shifted from the at least one up-chirp frequency caused by a relative motion of at least one of the target and the LIDAR system, and an adjusted down-chirp frequency shifted from the at least one down-chirp frequency caused by the relative motion of at least one of the target and the LIDAR system, the adjusted up-chirp frequency and the adjusted down-chirp frequency producing a first set of peaks associated with the at least one up-chirp frequency corresponding to a target location of the target and a second set of peaks associated with the at least one down-chirp frequency corresponding to the target location; and determine the target location using the first set of peaks and the second set of peaks.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes various examples of LIDAR systems and methods for automatically mitigating ghosting that may occur due to Doppler shifts. According to some embodiments, the described LIDAR system may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

LIDAR systems described by the embodiments herein include coherent scan technology to detect a signal returned from a target to generate a coherent heterodyne signal, from which range and velocity information of the target may be extracted. A signal, or multiple signals, may include an up-sweep of frequency (up-chirp) and a down-sweep of frequency (down-chirp), either from a single optical source or from separate optical source (i.e., one source with an up-sweep and one source with a down-sweep). Accordingly, two different frequency peaks, one for the up-chirp and one for the down-chirp, may be associated with a target and can be used to determine target range and velocity. However, peak images may also occur when the LIDAR system processes the signals. If these peak images are used to detect a target, this may cause the LIDAR system to detect a target in a location where there is no target. This may be referred to as ghosting. Using the techniques described herein, embodiments of the present invention can, among other things, address the issues described above by introducing phase modulations into the sweeps/chirps. This allows the LIDAR system to match the peaks and/or peak images with an expected peak shape to differentiate between the peaks (e.g., true peaks) and peak images. A peak image may also be referred to as an image peak.

Figure 1:
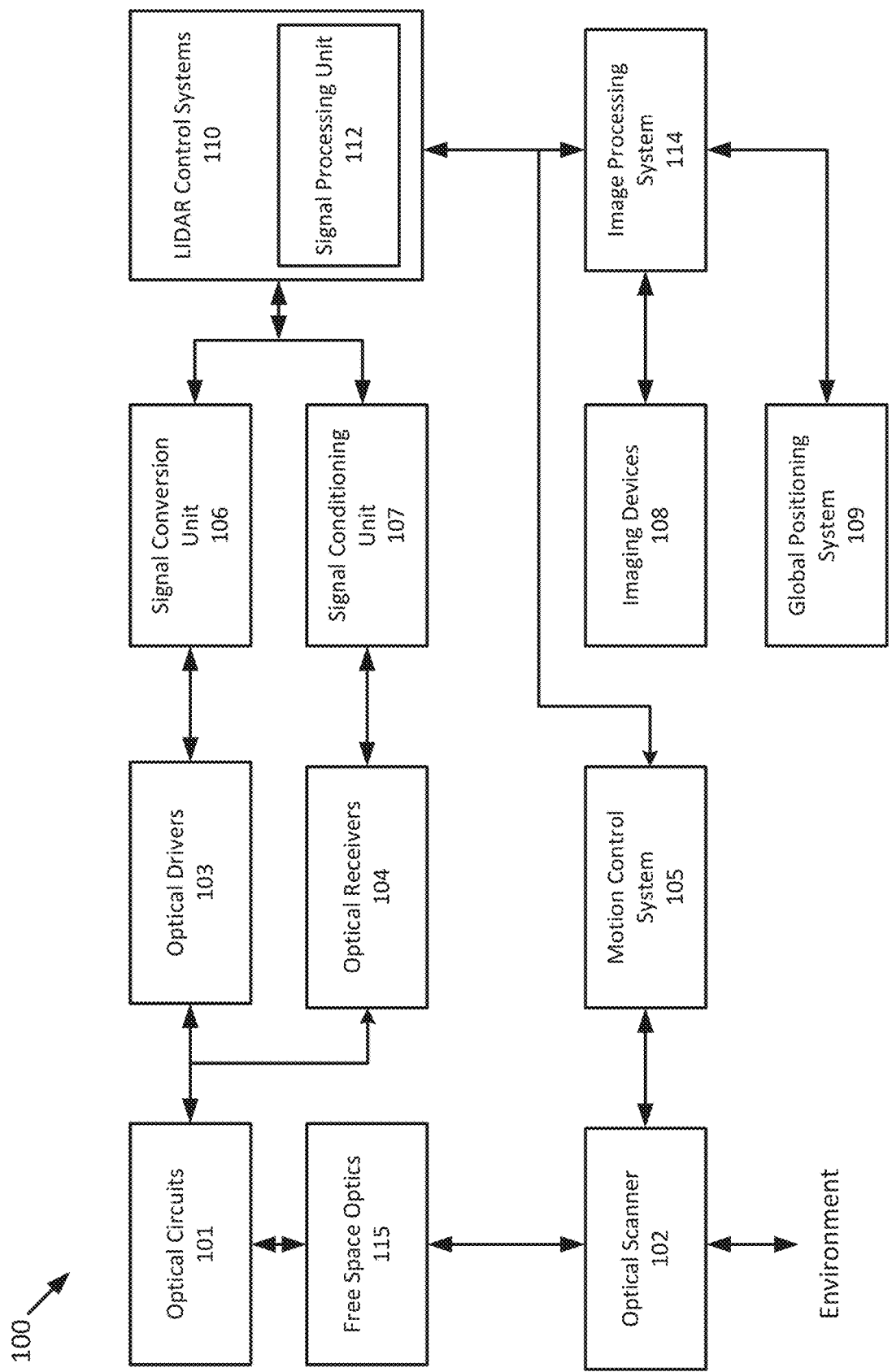
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical components include optical beams at different wavelengths, and include one or more optical amplifiers, one or more optical detectors, or the like.

Free space optics 115 may include one or more optical waveguides to carry optical signals, and route and manipulate optical signals to appropriate input/output ports of the active optical components. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In some examples, the LIDAR control systems 110 may include memory to store data, and instructions to be executed by the processing device. The memory may be, for example, read-only memory (ROM), random-access memory (RAM, programmable read-only memory (PROM), erasable programmable read-only memory (EPROM), electrically erasable programmable read-only memory (EEPROM), flash memory, magnetic disk memory such hard disk drives (HDD), optical disk memory such as compact-disk read-only (CD-ROM) and compact disk read-write memory (CD-RW), or any other type of non-transitory memory.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
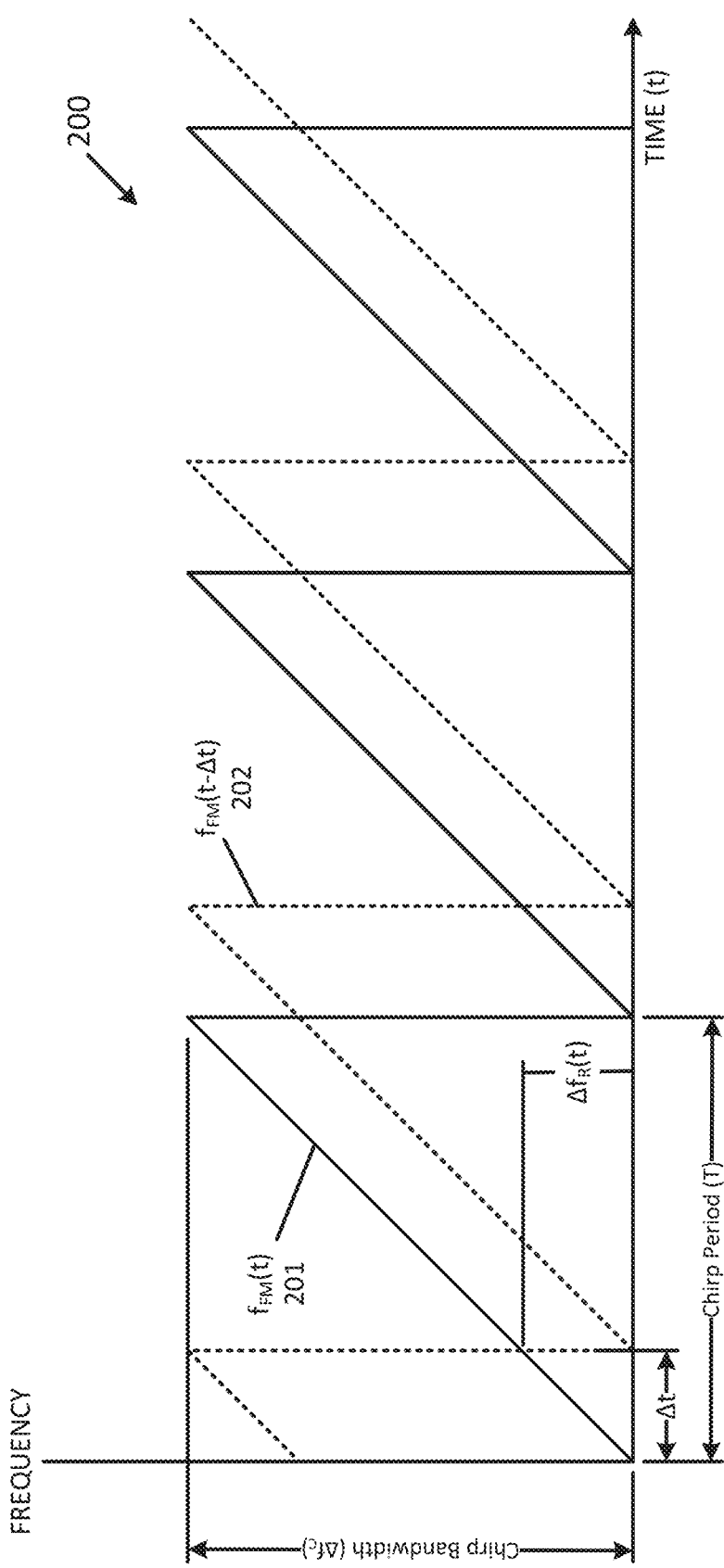
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 (e.g., a returned signal) according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
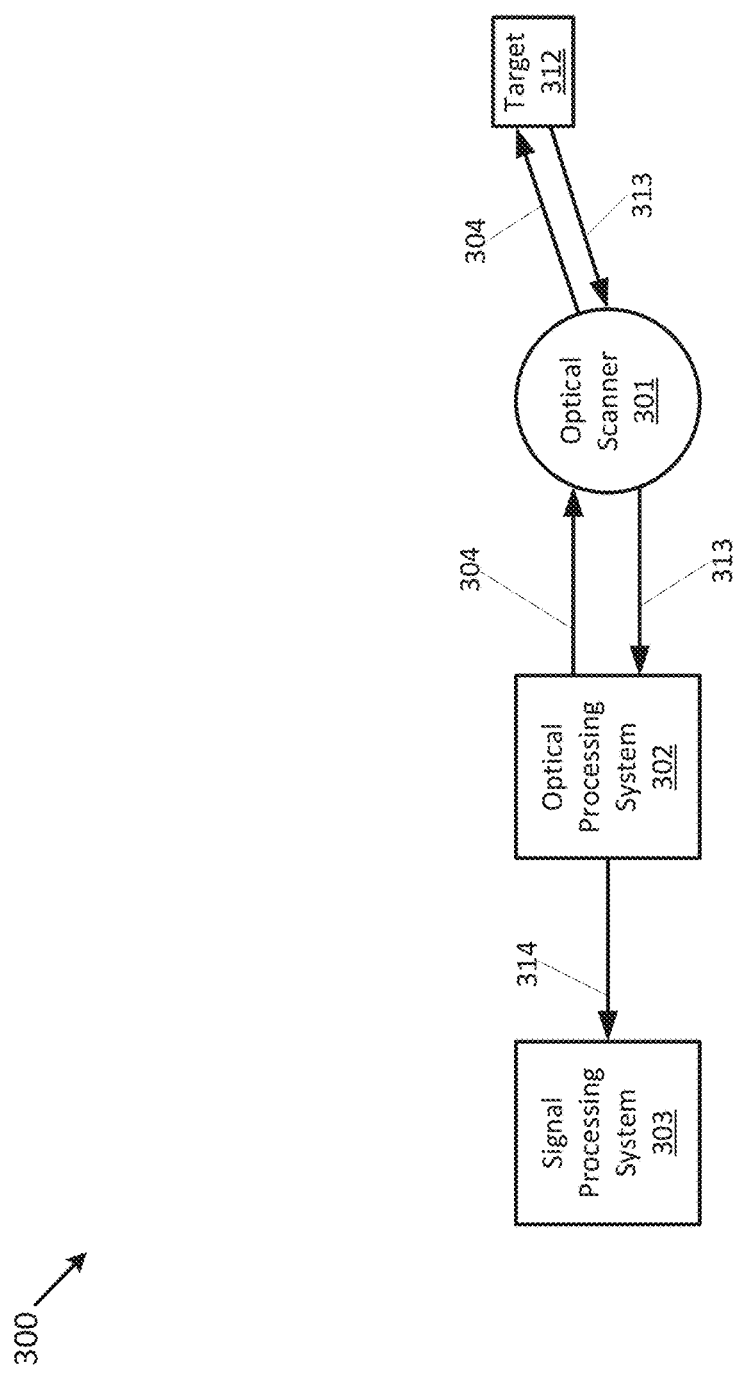
FIG. 3A is a block diagram illustrating an example LIDAR system according to the present disclosure.

FIG. 3A is a block diagram illustrating an example FMCW LIDAR system 300 according to the present disclosure. Example system 300 includes an optical scanner 301 to transmit an FMCW (frequency-modulated continuous wave) infrared (IR) optical beam 304 and to receive a return signal 313 from reflections of the optical beam 304 from targets such as target 312 in the field of view (FOV) of the optical scanner 301. System 300 also includes an optical processing system 302 to generate a baseband signal 314 in the time domain from the return signal 313, where the baseband signal 314 contains frequencies corresponding to LIDAR target ranges. Optical processing system 302 may include elements of free space optics 115, optical circuits 101, optical drivers 103 and optical receivers 104 in LIDAR system 100. System 300 also includes a signal processing system 303 to measure energy of the baseband signal 314 in the frequency domain, to compare the energy to an estimate of LIDAR system noise, and to determine a likelihood that a signal peak in the frequency domain indicates a detected target. Signal processing system 303 may include elements of signal conversion unit 106, signal conditioning unit 107, LIDAR control systems 110 and signal processing unit 112 in LIDAR system 100.

Figure 3B:
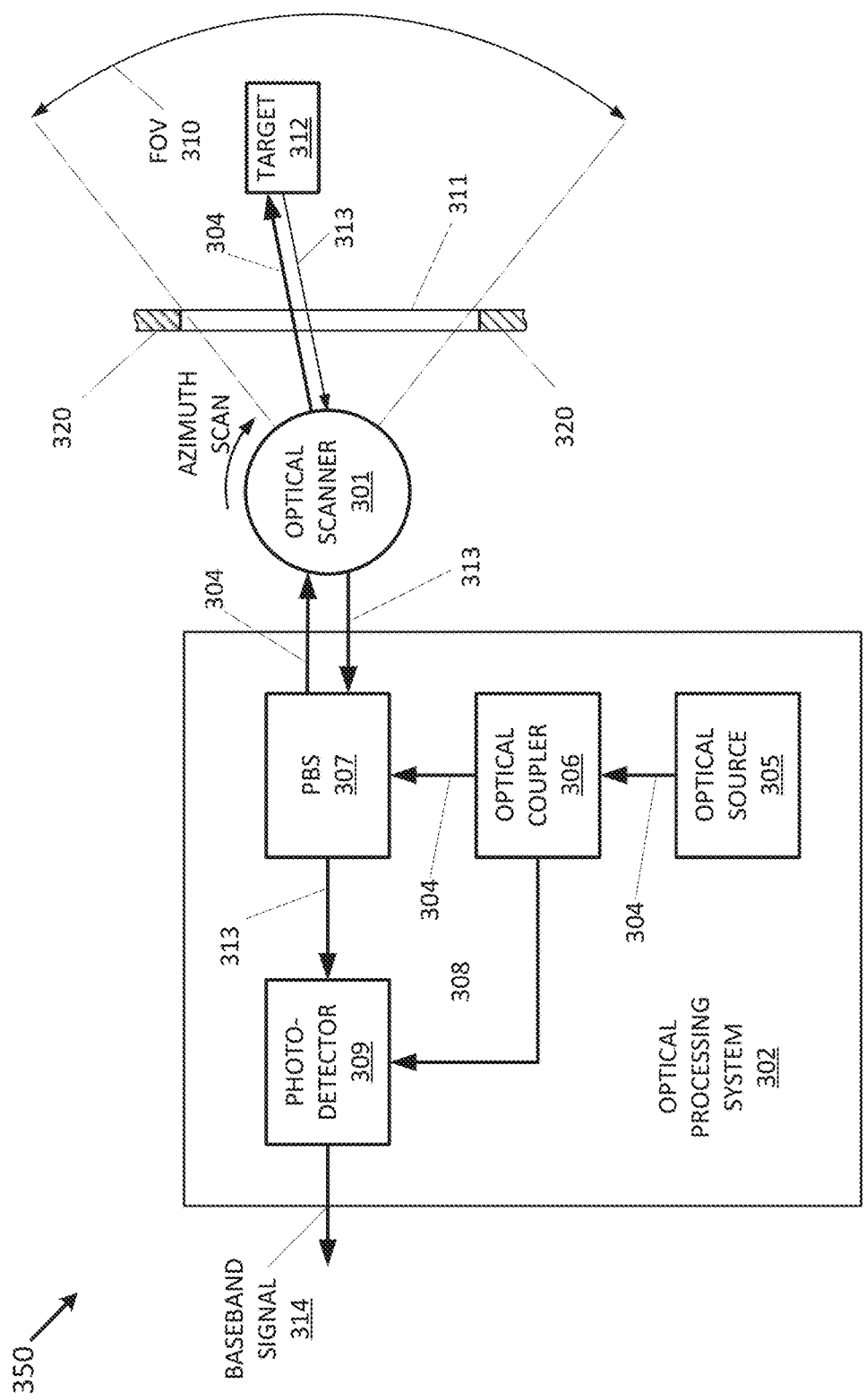
FIG. 3B is a block diagram illustrating an electro-optical optical system according to the present disclosure.

FIG. 3B is a block diagram illustrating an example electro-optical system 350. Electro-optical system 350 includes the optical scanner 301, similar to the optical scanner 102 illustrated and described in relation to FIG. 1. Electro-optical system 350 also includes the optical processing system 302, which as noted above, may include elements of free space optics 115, optical circuits 101, optical drivers 103, and optical receivers 104 in LIDAR system 100.

Electro-optical processing system 302 includes an optical source 305 to generate the frequency-modulated continuous-wave (FMCW) optical beam 304. The optical beam 304 may be directed to an optical coupler 306 that is configured to couple the optical beam 304 to a polarization beam splitter (PBS) 307 and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering the field of view (FOV) 310 of a LIDAR window 311 in an enclosure 320 of the optical system 350. In FIG. 3B, for ease of illustration, only the azimuth scan is illustrated.

As shown in FIG. 3B, at one azimuth angle (or range of angles), the optical beam 304 passes through the LIDAR widow 311 and illuminates a target 312. A return signal 313 from the target 312 passes through LIDAR window 311 and is directed by optical scanner 301 back to the PBS 307.

The return signal 313, which will have a different polarization than the optical beam 304 due to reflection from the target 312, is directed by the PBS 307 to the photodetector (PD) 309. In PD 309, the return signal 313 is optically mixed with the local sample 308 of the optical beam 304 to generate a range-dependent baseband signal 314 in the time domain. The range-dependent baseband signal 314 is the frequency difference between the local sample 308 of the optical beam 304 and the return signal 313 versus time (i.e., $\Delta f_R(t)$). The range-dependent baseband signal 314 may be in a frequency domain and may be generated by mixing at least one up-chirp frequency and at least one down-chirp frequency with the return signal 313. The at least one down-chirp frequency may be delayed in time proportional to the relative motion of at least one of the target and the LIDAR system.

Figure 4:
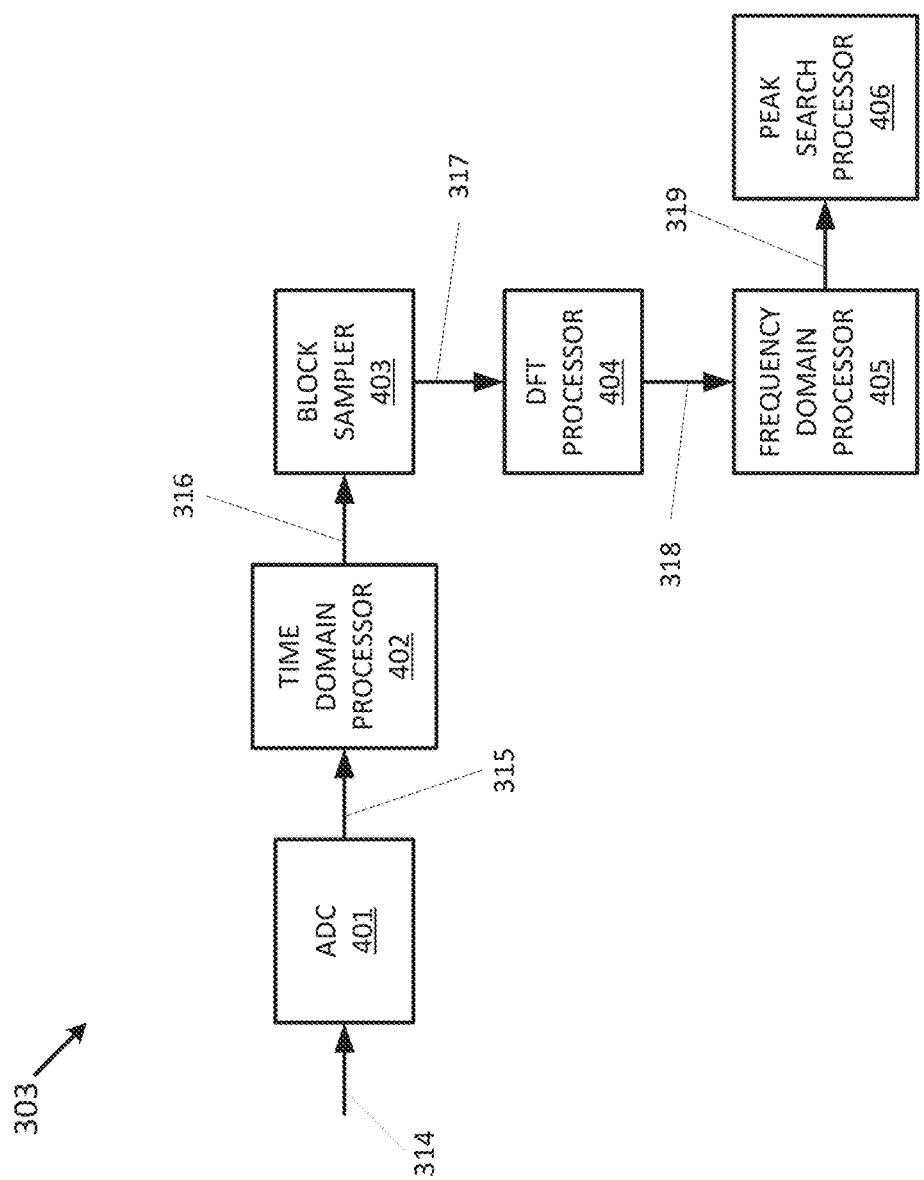
FIG. 4 is a block diagram of an example signal processing system according to the present disclosure.

FIG. 4 is a detailed block diagram illustrating an example of the signal processing system 303, which processes the baseband signal 314 according to some embodiments. As noted above, signal processing unit 303 may include elements of signal conversion unit 106, signal conditioning unit 107, LIDAR control systems 110 and signal processing unit 112 in LIDAR system 100.

Signal processing system 303 includes an analog-to-digital converter (ADC) 401, a time domain signal processor 402, a block sampler 403, a discrete Fourier transform processor 404, a frequency domain signal processor 405, and a peak search processor 406. The component blocks of signal processing system 303 may be implemented in hardware, firmware, software, or some combination of hardware, firmware and software.

In FIG. 4, the baseband signal 314, which is a continuous analog signal in the time domain, is sampled by ADC 401 to generate a series of time domain samples 315. The time domain samples 315 are processed by the time domain processor 402, which conditions the time domain samples 315 for further processing. For example, time domain processor 402 may apply weighting or filtering to remove unwanted signal artifacts or to render the signal more tractable for subsequent processing. The output 316 of time domain processor 402 is provided to block sampler 403. Block sampler 403 groups the time domain samples 316 into groups of N samples 317 (where N is an integer greater than 1), which are provided to DFT processor 404. DFT processor 404 transforms the groups of N time domain samples 317 into N frequency bins or subbands 318 in the frequency domain, covering the bandwidth of the baseband signal 314. The N subbands 319 are provided to frequency domain processor 405, which conditions the subbands for further processing. For example, frequency domain processor 405 may resample and/or average the subbands 319 for noise reduction. Frequency domain processor 405 may also calculate signal statistics and system noise statistics. The processed subbands 319 are then provided to a peak search processor 406 that searches for signal peaks representing detected targets in the FOV of the LIDAR system 300.

Figure 5:
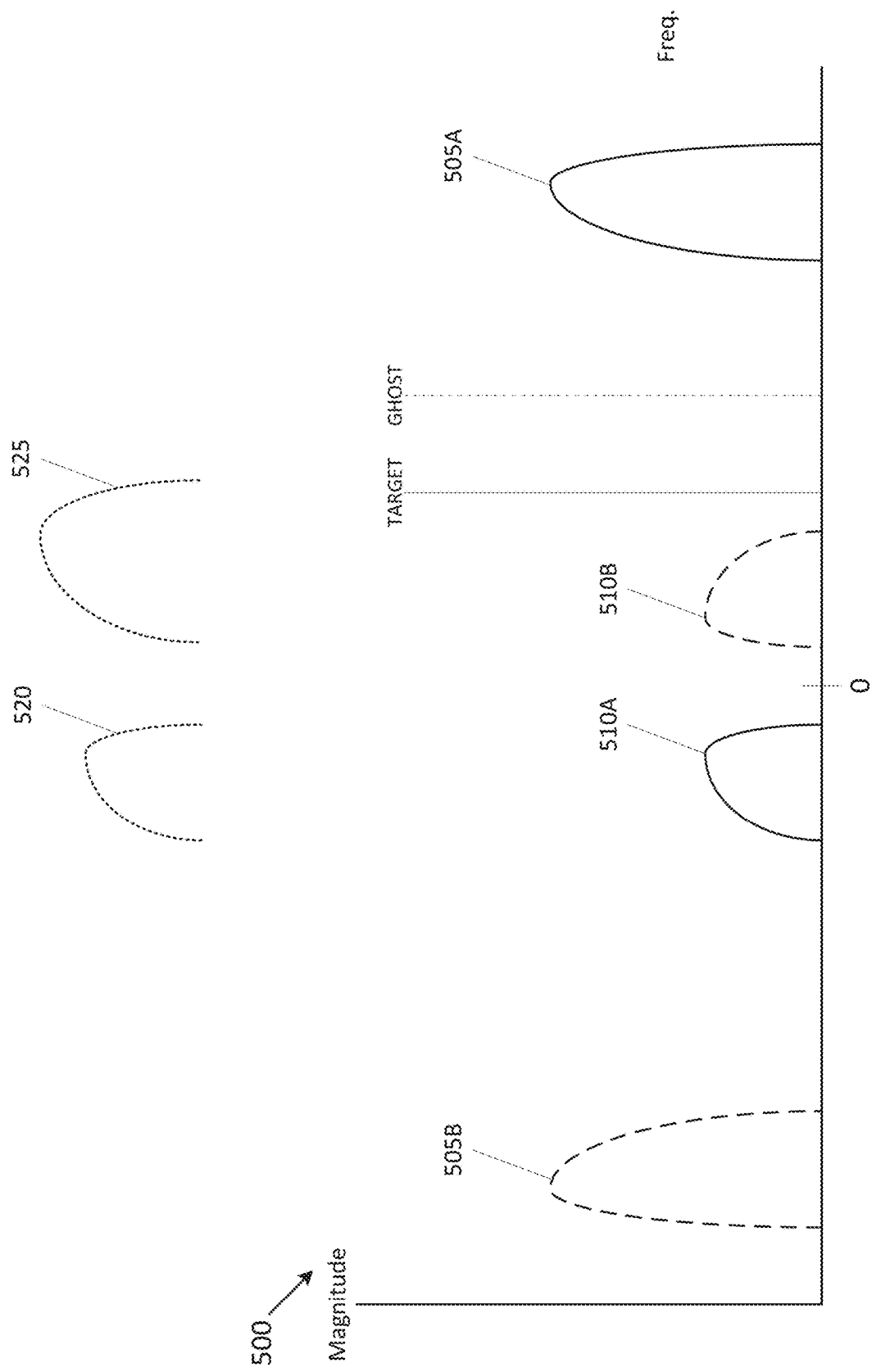
FIG. 5 is a signal magnitude-frequency diagram illustrating signal peaks for a target according to the present disclosure.

FIG. 5 is an example of a signal magnitude-frequency diagram 500 illustrating signal peaks for multiple targets according to some embodiments. An LIDAR system (e.g., a FMCW LIDAR system) may generate an up-chirp and a down-chirp frequency modulation (also referred to herein as up-sweep and down-sweep) to scan an environment and to determine range and velocity of targets within that environment. In one example, a single optical source may generate both the up-chirp and the down-chirp. In another example, the system may include an optical source to generate a signal that includes the up-chirp and another optical source to generate a signal that include the down-chirp. Using the returned signal and corresponding generated beat frequencies (i.e., peak frequencies) from the up-chirp and down-chirp, a signal processing system can determine one or more of a range of a target and a velocity of the target. For instance, according to some embodiments, the signal processing unit 112 can be configured to determine the range of the target by calculating a distance from the LIDAR system 500 using multiple frequencies corresponding to respective peaks. As discussed above, the signal processing unit 112 may generate a baseband signal in a frequency domain by mixing at least one up-chirp frequency and at least one down-chirp frequency with the one or more returned signals. The at least one down-chirp frequency may be delayed in time proportional to the relative motion of at least one of the target and the LIDAR system 500. The baseband signal may include the peaks 505A, 505B, 510A, and 510B, and may include additional peaks (not illustrated in FIG. 5).

According to some embodiments, the signal processing unit 112 can be configured to determine the velocity of the target using differences between the multiple frequencies corresponding to the peaks. However, as depicted in FIG. 5, there may arise situations in which image peaks (sometimes referred to as "mirror images," "image ghosts" or the like) are also present in the baseband signal. This may cause the LIDAR system to detect false (or "fake") targets rather than desirable "true" targets or peaks (or "true images" or "true peaks").

As illustrated in FIG. 5, the signal magnitude-frequency diagram 500 includes peak 505A, peak 505B, peak 510A, and peak 510B. A frequency of 0 (e.g., 0 hertz, 0 terahertz, etc.) is also indicated in the signal magnitude-frequency diagram 500. Peaks 505A, 505B, 510A and 510B may be present in the baseband signal that is processed and/or analyzed by a signal processing unit of the LIDAR system (e.g., signal processing unit 112 illustrated in FIG. 1), as discussed in more detail below. Peak 505B may be a mirror image of peak 505A. For example, peak 505B is mirrored across the frequency 0 and shares the same properties of peak 505A (e.g., same curvature or shape). Peak 505B may be referred to as a peak image or image peak. Peak 505A may be conjugate symmetric to peak 505A and vice versa. Peak 510B may be a mirror image of peak 510A. For example, peak 510B is mirrored across the frequency 0 and shares the same properties of peak 510A (e.g., same curvature or shape). Peak 510B may also be referred to as a peak image or image peak. Peak 510A may be conjugate symmetric to peak 510A and vice versa. In some scenarios, peak 505A is shifted (e.g., moved) upwards in frequency from the location of the target (as indicated by the solid vertical line in the signal magnitude-frequency diagram 500). Peak 505A may be referred to as an upshifted peak, as a Doppler shifted peak, or as $F_{up}$. Peak 510A is shifted downwards in frequency from the location of the target (as indicated by the solid vertical line in the signal magnitude-frequency diagram 500). Peak 510A may be referred to as a downshifted peak, as a Doppler shifted peak, or as $F_{dn}$. The shift in the peaks may be due to the movement of one or more of the target and/or sensors from a LIDAR system (e.g., a FMCW or similar LIDAR system). For example, the target may be moving, the device (e.g., a vehicle, a smartphone, etc.) that includes the LIDAR sensors (e.g., optical scanner 102 and/or optical circuits 101 illustrated in FIG. 1, etc.) may be moving, or both the target and the device may be moving relative to a particular point.

Because peak 505A has been shifted up (e.g., upshifted) to a higher frequency, peak 505B (e.g., a peak image) is located at a corresponding negative frequency. For example, if peak 505A was shifted to a frequency J, then peak 505B would be located at the frequency −J. In addition, because peak 510A has been shifted down (e.g., downshifted) to a lower frequency, peak 510B (e.g., a peak image) is located at a corresponding positive frequency. Peak 505B may be referred to as $-F_{up}$ and peak 510B may be referred to as $-F_{dn}$. In some embodiments, peak 505A (and corresponding peak 505B) may correspond to the up-chirp signals (e.g., up-chirp signals from a particular target), and 510A (and corresponding peak 510B) may correspond to down-chirp signals. In other embodiments, peak 505A (and corresponding peak 505B) may correspond to the down-chirp signals, and 510A (and corresponding peak 510B) may correspond to the up-chirp signals (e.g., down-chirp signals from a particular target).

In one embodiment, the LIDAR system (e.g., signal processing unit 112 of LIDAR system 100 illustrated in FIG. 1) may determine sets of frequency bins around peak 505A and peak 505B. For example, LIDAR system may select a first group/bin of frequencies around peak 505A (e.g., a group of frequencies that includes frequencies higher and lower than peak 505A) and a second group/bin of frequencies around peak 505B (e.g., a group of frequencies that includes frequencies higher and lower than peak 505B). The second group/bin of frequencies may include negative frequency values that correspond to positive frequency values in the first bin/group of frequencies. The LIDAR system may also determine sets of frequency bins around peak 510A and peak 510B. For example, LIDAR system may select a third group/bin of frequencies around peak 510A (e.g., a group of frequencies that includes frequencies higher and lower than peak 510A) and a fourth group/bin of frequencies around peak 510B (e.g., a group of frequencies that includes frequencies higher and lower than peak 510B). The fourth group/bin of frequencies may include negative frequency values that correspond to positive frequency values in the third bin/group of frequencies.

In some embodiments, the LIDAR system (e.g., signal processing unit 112 of LIDAR system 100 illustrated in FIG. 1) may select peak 505A. For instance, when the target is at a closer range (e.g., within a first threshold range of the LIDAR), the peak with the highest frequency (e.g., peak 505A) may be determined to be a true peak corresponding to a target, rather than a peak image, and hence selected by the LIDAR system (e.g., signal processing unit 112 illustrated in FIG. 1). In this fashion, the signal processing unit 112 is configured to select peak 505A based on the type of ghosting that is occurring (e.g., close-range ghosting or far-range ghosting). Thus, the LIDAR (e.g., signal processing unit 112 illustrated in FIG. 1) may be able to determine that the peak 505A should be used when determining the range or distance to the target. In addition, because the LIDAR system (e.g., signal processing unit 112 illustrated in FIG. 1) has determined that the peak 505A is a true peak (and not a peak image), the LIDAR system may also determine that peak 505B (which has the negative frequency of peak 505A) is a peak image.

As discussed above, there may arise situations in which peak images (e.g., peaks 505B and 510B) are also present. For example, due to hardware and computational resources, the beat signal may undergo real sampling and frequency peaks may be assumed to be positive. However, if the target is at a closer range (e.g., within a first threshold range of the LIDAR system), a negative Doppler shift can cause a beat frequency peak to become negative. For example, due to downshifting, the peak 510A has a negative frequency. In contrast to embodiments of the present disclosure, this may cause conventional systems to select peak 510B instead of peak 510A when determining the location of the target. For example, when peak 505A and peak 510A are used, the target location may be determined as follows: $(F_{up} - F_{dn})/2$. Thus, the target (e.g., the true target location) is determined to be towards the middle of peak 505A and peak 510A. However, if peak 505A and peak 510B are used, the target location (e.g., the location of a ghost or ghost target) may be determined as follows: $(F_{up} + F_{dn})/2$. Thus, the ghost target (e.g., represented using a dotted-dashed vertical line) is detected towards the middle of peak 505A and peak 510B.

As illustrated in FIG. 5, the peaks 505A and 510A have a shape, which may be referred to as a peak shape or a spectral shape. The spectral shape of the peaks 505A and 510A may be caused by, created by, generated by, etc., the phase modulation of the up-chirp and the down-chirp, as discussed in more detail below. The modulation of the up-chirp and the down-chirp may be performed by an optical scanner (e.g., optical scanner 102 illustrated in FIG. 1). Because peaks 505B and 510B are mirror images of peaks 505A and 505B respectively, the shapes of peaks 505B and 510B are also mirror images of the shapes of peaks 505A and 510A. According to some embodiments, rather than adding phase modulation to the up-chirp and the down-chirp, the LIDAR system (e.g., signal processing unit 112 illustrated in FIG. 1) may estimate inherent phase impairments in the up-chirp and the down-chirp to determine the shapes of the peaks 505A, 505B, 510A, and 510B.

In some embodiments, the LIDAR system (e.g., optical scanner 102 illustrated in FIG. 1) may introduce phase modulations in the up-chirp and the down-chirp. These phase modulations may also be referred to as non-linear phase modulations, non-linearities, phase non-linearities, etc. The LIDAR system (e.g., signal processing unit 112 illustrated in FIG. 1) may also select peak 505A as $F_{true}$ (e.g., as a first peak), as discussed above. The LIDAR system (e.g., signal processing unit 112 illustrated in FIG. 1) may also determine a first range estimate based on peak 510A and a second range estimate based on peak 510B. When determining (e.g., compute, calculate, obtain, etc.) the first range estimate for peak 510A, the equation $(F_{up} - F_{dn})/2$ may be used. When determining the second range estimate for peak 510B, the equation $(F_{up} + F_{dn})/2$ may be used.

In some embodiments, the LIDAR system (e.g., signal processing unit 112 illustrated in FIG. 1) may determine a first spectral estimate 520 for peak 510A and a second spectral estimate 525 for peak 510B. For example, the first spectral estimate 520 may be determined based on the first range estimate and the phase modulations (e.g., the phase non-linearities that are introduced or are inherent in the chirp that is associated with the peak 510A). In another example, the second spectral estimate 525 may be determined based on the spectral range estimate and the phase modulations (e.g., the phase non-linearities that are introduced or are inherent in the chirp that is associated with the peak 510B). The spectral estimates may also be referred to as shapes, peak shapes, etc.

In some embodiments, the LIDAR system (e.g., signal processing unit 112 illustrated in FIG. 1) may determine whether the first spectral estimate 520 matches the shape of the peak 510A and whether the second spectral estimate 525 matches the shape of peak 510B. For example, the LIDAR system may determine that the spectral estimate 520 (e.g., a peak shape) most closely matches the shape of the peak 510A and that the spectral estimate 525 does not match the shape of peak 510B as closely. Thus, the LIDAR system may select peak 510A. As discussed above, peak 505A was previously selected by the LIDAR system. By using the peak 505A (e.g., a first peak) and the peak 510A (e.g., a second peak), the LIDAR system may be able to compute the true or correct location of the target. This may allow the LIDAR system to mitigate close or closer range ghosting.

In one embodiment, the LIDAR system (e.g., signal processing unit 112 illustrated in FIG. 1) may select one of peak 505A or peak 505B to be the true peak when one of peak 505A or peak 505B is within a maximum Doppler shift relative to a minimum detectable frequency set for the LIDAR system.

If the peak 505A is the true peak, the signal processing unit 112 may compute (e.g., determine, calculate, obtain, etc.) a first target range estimate based on the peaks 505A and the 510A. The signal processing unit 112 may also use the first target range estimate and phase non-linearities in the one or more optical beams to determine a first peak shape estimate. The signal processing unit may also compute a second target range estimate based on the peak 505A and the peak 510B. The signal processing unit 112 may use the second target range estimate and the phase non-linearities to determine a second peak shape estimate. The signal processing unit 112 may also compare the first peak shape estimate and the second peak shape estimate to peak 510A and peak 510B. The signal processing unit 112 may determine that peak 510A corresponds to the target location if the first peak shape estimate and peak 510A produce a higher correlation than peak 505B and peak 510B. The signal processing unit 112 may determine that peak 510B corresponds to the target location if the second peak shape estimate and peak 510B produce a higher correlation than the first peak shape estimate and the peak 510A.

In one embodiment, if peak 510A is the true peak, the signal processing unit 112 may compute a first target range estimate based on peak 505A and the 510A and using the first target range estimate and phase non-linearities in the one or more optical beams to determine a third peak shape estimate. The signal processing unit 112 may also compute a second target range estimate based on peak 505B and peak 510A and using the second target range estimate and the phase non-linearities to determine a fourth peak shape estimate. The signal processing unit 112 may compare the third peak shape estimate and the fourth peak shape estimate to peak 505A and the peak 505B. If the third peak shape estimate and peak 505A produce a higher correlation than the fourth peak shape estimate and peak 505B, the signal processing unit 112 may determine that peak 505A to corresponds to the target location. If the fourth peak shape estimate and peak 505B produce a higher correlation than the third peak shape estimate and peak 505A, the signal processing unit 112 may determine that peak 505B to corresponds to the target location.

In one embodiment, the signal processing unit 112 may compare comparing the first peak shape estimate by comparing the first peak shape estimate to peak 510A and comparing the second peak shape estimate to peak 510B.

In one embodiment, the signal processing unit 112 may determine whether the first peak shape estimate matches the peak 510A by correlating the first peak shape estimate and peak 510A to produce a correlation and determining whether the correlation exceeds a predetermined threshold.

In one embodiment, the LIDAR system (e.g., signal processing unit 112 illustrated in FIG. 1) may select one of peak 505A or peak 510A to be the true peak when one of peak 505A or peak 510A is within a maximum Doppler shift relative to a Nyquist frequency. If peak 505A is the true peak, the signal processing unit 112 may compute (e.g., calculate, determine, generate, etc.) a first target range estimate based on peak 505A and peak 510A. The signal processing unit 112 may use the first target range estimate and phase non-linearities in the one or more optical beams to determine a first peak shape estimate. The processing unit 112 may also compute a second target range estimate based on peak 505A and peak 510B and using the second target range estimate and the phase non-linearities to determine a second peak shape estimate. The signal processing unit 112 may compare the first peak shape estimate and the second peak shape estimate to peaks 510A and 510B respectively. If the first peak shape estimate and peak 510A produce a higher correlation than the second peak shape estimate and peak 510B. If the first peak shape estimate and peak 510A produce a higher correlation than the second peak shape estimate and peak 510B, the processing unit 112 may determine that peak 510A corresponds to the target location. If the second peak shape estimate and peak 510B produce a higher correlation than the first peak shape estimate and peak 510A, the signal processing unit 112 may determine that peak 510B corresponds to the target location. The true peak may be set to a combination of the Nyquist frequency and a frequency corresponding to peak 510B.

In one embodiment, if one or more of peaks 505A and 510A are within a maximum Doppler shift relative to a minimum detectable frequency set for the Lidar system and the Doppler shift between the LIDAR system and the target is predetermined (which may produce a predetermined Doppler shift), the LIDAR system (e.g., signal processing unit 112) may select from peaks 505A and 510A, a first true peak location corresponding to the target location, based on a highest frequency that has a positive value. If peak 505A is selected as the first true peak location, the signal processing unit 112 may estimate a second true peak location based on the predetermined Doppler shift and peak 505A. The signal processing unit 112 may then determine the target location based on a selection between peaks 510A and 510B based on a proximity with the second true peak location. If peak 510A is selected as the first true peak location, the signal processing unit 112 may estimate the second true peak location based on the predetermined Doppler shift and peak 510A. The signal processing unit 112 may then determine the target location based on a selection between the second peak and the first peak based on a proximity with the second true peak location. In one embodiment, the predetermined Doppler shift is selected based on at least one of an ego-velocity, previous frame information, and neighboring points information.

In one embodiment, if one or more of peak 505A and peak 510A are within the maximum Doppler shift relative to the Nyquist frequency, and the Doppler shift between the LIDAR system and the target is predetermined (which may produce a predetermined Doppler shift), the LIDAR system (e.g., signal processing unit 112) may select from peak 505A and peak 510A, a first true peak location corresponding to the target location based on a lowest frequency with a positive frequency value. If peak 505A is the first true peak location, the signal processing unit 112 may estimate a second true peak location based on the predetermined Doppler shift, peak 505A, and a Nyquist frequency. The signal processing unit 112 may then determine a target location based on a selection between peak 510A and 510B based on a proximity with the second true peak location. If peak 510A is selected as the first true peak location, the signal processing unit 112 may estimate the second true peak location based on the predetermined Doppler shift and peak 510A, and the Nyquist frequency. The signal processing unit 112 may then determine the target location based on the selection between peak 505A and peak 505B based on a proximity with the second true peak location. As discussed above, the predetermined Doppler shift may be selected based on at least one of ego-velocity, previous frame information, and neighboring points information.

Figure 6:
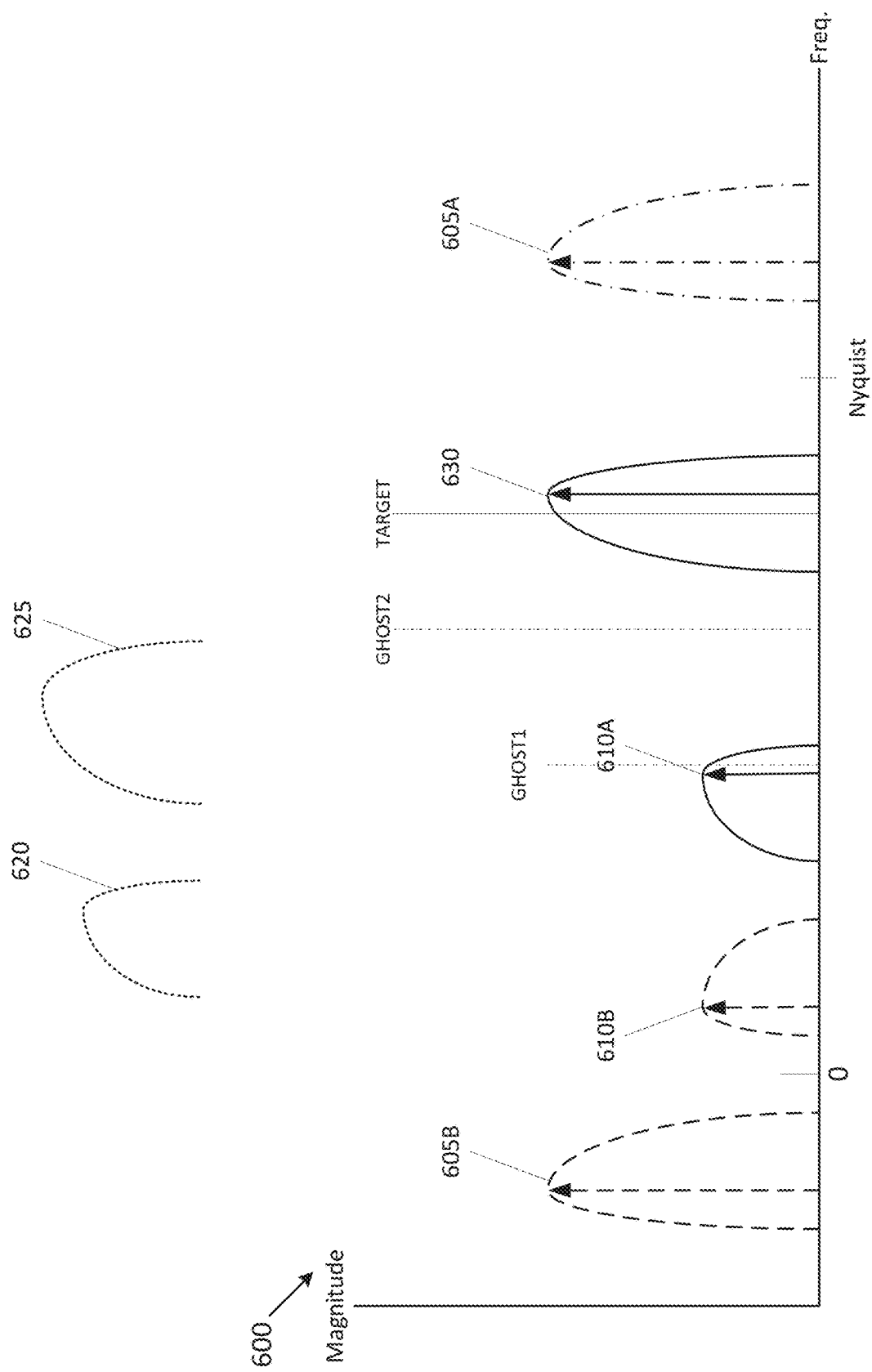
FIG. 6 is a signal magnitude-frequency diagram illustrating signal peaks for a target according to the present disclosure.

FIG. 6 is an example of a signal magnitude-frequency diagram 600 illustrating signal peaks for multiple targets according to some embodiments. As discussed above, an LIDAR system (e.g., LIDAR system 100 illustrated in FIG. 1) may generate an up-chirp and a down-chirp frequency modulation to scan an environment and to determine range and velocity of targets within that environment. One or more optical sources may generate the up-chirp and the down-chirp. As described above, using the returned signal and corresponding generated beat frequencies (i.e., peak frequencies) from the up-chirp and down-chirp, a signal processing system (e.g., signal processing unit 112 illustrated in FIG. 1) can determine one or more of a range and/or a velocity of a target. As discussed above, the signal processing unit 112 may generate a baseband signal in a frequency domain by mixing at least one up-chirp frequency and at least one down-chirp frequency with the one or more returned signals. The at least one down-chirp frequency may be delayed in time proportional to the relative motion of at least one of the target and the LIDAR system. The baseband signal may include the peaks 605A, 605B, 610A, 610B, and 630, and may include additional peaks (not illustrated in FIG. 6).

However, as depicted in FIG. 6, there may arise situations in which peak images (e.g., image peaks) are also present in the baseband signal. In addition, a peak may be shifted (e.g., Doppler shifted, upshifted, etc.) past the Nyquist frequency or Nyquist limit of the system LIDAR. These issues may cause the LIDAR system to detect a ghost (e.g., a fake target) rather than the true target.

As illustrated in FIG. 6, the signal magnitude-frequency diagram includes peak 605A, peak 605B, peak 610A, peak 610B, and peak 630. A frequency of 0 (e.g., 0 hertz, 0 terahertz, etc.) is also indicated in the signal magnitude-frequency diagram 600. Peak 605A may be the true peak. However, because peak 605A has been upshifted (e.g., Doppler shifted) past the Nyquist frequency, peak 605A may be reflected back across the Nyquist frequency resulting in peak 630 (e.g., peak 630 may be a peak image of peak 605A across the Nyquist frequency). Peak 630 may be referred to as a Nyquist image. Peak 605A may be referred to as $F_{true}$ (e.g., a true peak).

Peak 605B may be a mirror image of peak 630. For example, peak 605B is mirrored across the frequency 0. Peak 605B may be referred to as a peak image (e.g., an image peak). Peak 610B may be a mirror image of peak 610A. For example, peak 610B is mirrored across the frequency 0. Peak 610B may also be referred to as a peak image (e.g., an image peak). Peak 605A is shifted (e.g., moved) upwards in frequency from the location of the target (as indicated by the solid vertical line in the signal magnitude-frequency diagram 600). Peak 605A may be referred to as an upshifted peak, as a Doppler shifted peak. However, because peak 605A was upshifted past the Nyquist frequency, the LIDAR system (e.g., signal processing unit 112 illustrated in FIG. 1) may detect the peak image 630 as $F_{up}$. Peak 610A is shifted downwards in frequency from the location of the target (as indicated by the solid vertical line in the signal magnitude-frequency diagram 600). Peak 610A may be referred to as a downshifted peak, as a Doppler shifted peak, or as $F_{dn}$. The shift in the peaks may be due to the movement of one or more of the target and the LIDAR system. For example, the target may be moving, the device (e.g., a vehicle, a smartphone, etc.) that includes the LIDAR system may be moving, or both the target and the device may be moving.

Peak 605B (e.g., a peak image) is located at a negative frequency corresponding to peak 630. For example, if peak 630 is at a frequency J, then peak 605B would be located at the frequency −J. In addition, because peak 610A has been shifted down (e.g., downshifted) to a lower frequency, peak 610B (e.g., a peak image) is located at a corresponding positive frequency. Peak 605B may be referred to as $-F_{up}$ and peak 610B may be referred to as $F_{dn}$. In some embodiments, peak 605A (and corresponding peaks 605B and 630) may correspond to the up-chirp of the LIDAR system, and 610A (and corresponding peak 610B) may correspond to the down-chirp of the LIDAR system. In other embodiments, peak 605A (and corresponding peaks 605B and 630) may correspond to the down-chirp of the LIDAR system, and 610A (and corresponding peak 610B) may correspond to the up-chirp of the LIDAR system.

In some embodiments, the LIDAR system (e.g., signal processing unit 112 illustrated in FIG. 1) may determine (e.g., calculate, determine, generate, etc.) peak 630. When the target is at a farther range (e.g., beyond a second threshold range of the LIDAR), the peak with the highest frequency (e.g., peak 630) may not be the true peak, but rather an image of the true peak (e.g., peak 605A) reflected over the Nyquist frequency. This may be due to the peak 605A being Doppler shifted or upshifted from past the Nyquist frequency. Thus, the LIDAR system may determine (e.g., calculate, obtain, generate, etc.) peak 605A based on 630. The LIDAR system (e.g., signal processing unit 112 illustrated in FIG. 1) may determine peak 605A based on peak 630 (e.g., $F_{up}$) and the Nyquist frequency (e.g., $F_{Nyquist}$) using the following equation: $(2*F_{Nyquist}-F_{up})$.

As discussed above, there may arise situations in which peak images (e.g., peaks 605B and 610B) are also present. For example, due to hardware and computational resources, the beat signal may undergo real sampling and frequency peaks may be assumed to be positive. However, if the target is at a closer range (e.g., within a first threshold range of the LIDAR), the negative Doppler shift can cause a beat frequency peak to decrease. For example, due to downshifting, the peak 610A has decreased. This may cause the LIDAR system (e.g., signal processing unit 112 illustrated in FIG. 1) to use peak 610B instead of peak 610A when determining the location of the target (e.g., the target location). For example, when peak 605A and peak 610A are used, the target location may be determined as follows: $((2*F_{Nyquist}-F_{up})-F_{dn})/2$. Thus, the target (e.g., the true target location) is determined to be towards the middle of peak 605A and peak 610A. However, if peak 630 and peak 610B are used, an incorrect target location (e.g., the location of a ghost or ghost target) may be determined as follows: $(F_{up}+F_{dn})/2$. Thus, a first ghost target (e.g., GHOST1) is detected towards the middle of peak 630 and peak 610B. In addition, if peak 630 and peak 610A are used, an incorrect target location may be determined as follows: $(F_{up}-F_{dn})/2$. Thus, a second ghost target (e.g., GHOST2) may be detected in the middle of peak 630 and peak 610A.

As illustrated in FIG. 6, the peaks 605A and 610A have a shape, which may be referred to as a peak shape or a spectral shape. The spectral shape of the peaks 605A and 610A may be caused by, created by, generated by, etc., the phase modulation of the up-chirp and the down-chirp, as discussed in more detail below. Because peaks 605B and 610B are mirror images of peaks 605A and 610A respectively, the shapes of peaks 605B and 610B are also mirror images of the shapes of peaks 605A and 605B. According to some embodiments, rather than adding phase modulation to the up-chirp and the down-chirp, the LIDAR system (e.g., signal processing unit 112 illustrated in FIG. 1) may estimate inherent phase impairments in the up-chirp and the down-chirp to determine the shapes of the peaks 605A, 605B, 610A, and 610B.

In some embodiments, the LIDAR system may introduce phase modulations in the up-chirp and the down-chirp. The modulation of the up-chirp and the down-chirp may be performed by an optical scanner of the LIDAR system (e.g., optical scanner 102 illustrated in FIG. 1). These phase modulations may also be referred to as non-linear phase modulations, non-linearities, phase non-linearities, etc. The LIDAR system (e.g., signal processing unit 112 illustrated in FIG. 1) may also determine (e.g., calculate, generate, etc.) peak 605A (e.g., as a first peak or $F_{true}$), as discussed above. The LIDAR system (e.g., signal processing unit 112 illustrated in FIG. 1) may also determine a first range estimate using peak 610A and a second range estimate using peak 610B. When determining (e.g., compute, calculate, obtain, etc.) the first range estimate for peak 610A, the equation $((2*F_{Nyquist}-F_{up})-F_{dn})/2$ may be used. When determining the second range estimate for peak 610B, the equation $((2*F_{Nyquist}-F_{up})+F_{dn})/2$ may be used.

In some embodiments, the LIDAR system (e.g., signal processing unit 112 illustrated in FIG. 1) may determine a first spectral estimate 620 for peak 610A and a second spectral estimate 625 for peak 610B. For example, the first spectral estimate 620 may be determined based on the first range estimate and the phase modulations (e.g., the phase non-linearities that are introduced or are inherent in the chirp that is associated with the peak 610A). In another example, the second spectral estimate 625 may be determined based on the spectral range estimate and the phase modulations (e.g., the phase non-linearities that are introduced or are inherent in the chirp that is associated with the peak 610B). The spectral estimates may also be referred to as shapes, peak shapes, etc.

In some embodiments, the LIDAR system (e.g., signal processing system 303 illustrated in FIG. 3A) may determine whether the first spectral estimate 620 matches the shape of the peak 610A and whether the second spectral estimate 625 matches the shape of peak 610B. For example, the LIDAR may determine that the spectral estimate 620 (e.g., a peak shape) matches the shape of the peak 610A and that the spectral estimate 625 does not match the shape of peak 610B. Thus, the LIDAR may select peak 610A. As discussed above, peak 605A was previously determined (e.g., calculated, generated, etc.) by the LIDAR. By using the peak 605A and the peak 610A, the LIDAR may be able to compute the true or correct location of the target. This may allow the LIDAR to mitigate far range ghosting.

Figure 7:
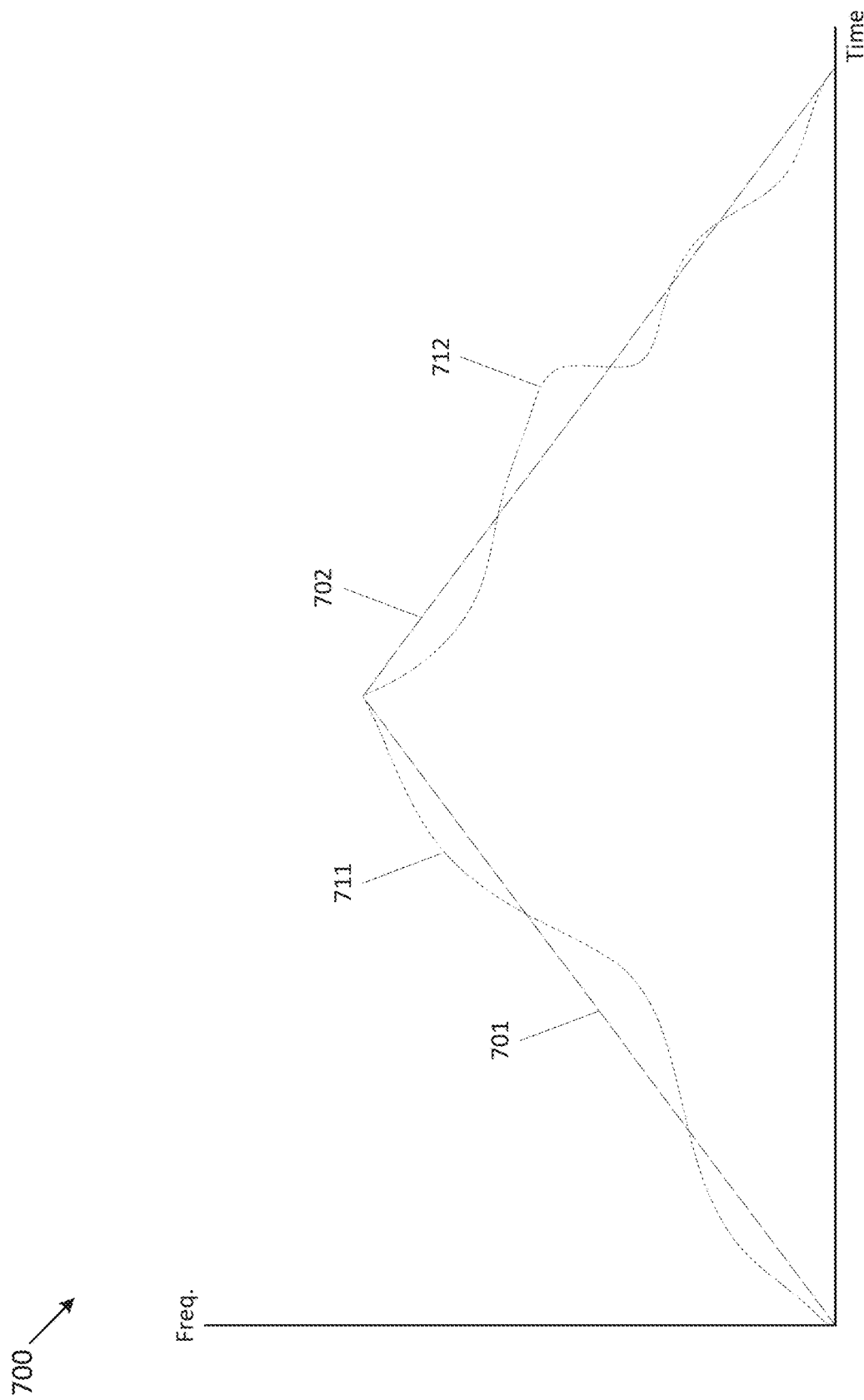
FIG. 7 is a time-frequency diagram illustrating one example of LIDAR waveforms according to the present disclosure.

FIG. 7 is a time-frequency diagram 700 of an FMCW scanning signal 701 and an FMCW scanning signal 702 that can be used by a LIDAR system, such as system 100, to scan a target environment according to some embodiments. FMCW scanning signal 701 may be referred to as an up-chirp, up-sweep, etc., because the frequency of the FMCW scanning signal 701 increases over time. FMCW scanning signal 702 may be referred to as a down-chirp, down-sweep, etc., because the frequency of the FMCW scanning signal 701 decreases over time.

As discussed above, phase modulations (e.g., non-linear phase modulations, non-linearities, phase non-linearities) may be added, introduced, etc., into the FMCW scanning signals. For example, FMCW scanning signal 711 may include phase modulations and FMCW scanning signal 712 may also include phase modulations. The phase modulations (e.g., modulation waveform) allow an FMCW LIDAR (e.g., LIDAR system) to detect a difference between a peak (e.g., a true peak) and peak image while not distorting (e.g., smearing) the peak to the point where it becomes difficult to detect. As discussed above, the spectral shape (e.g., shape, peak shape) a peak may also depend on the range to the target. The received signal may have the same phase modulation and, therefore, the spectral shape may depend upon the delay between the transmitted and received signals. Because the Doppler shift may not affect the spectral shape of the peak, a peak may have the same frequency but different spectral shapes if their corresponding targets are at different ranges. This allows the FMCW LIDAR to determine which peak (from multiple peaks) is an actual peak (e.g., a true peak) or a peak image.

Figure 8:
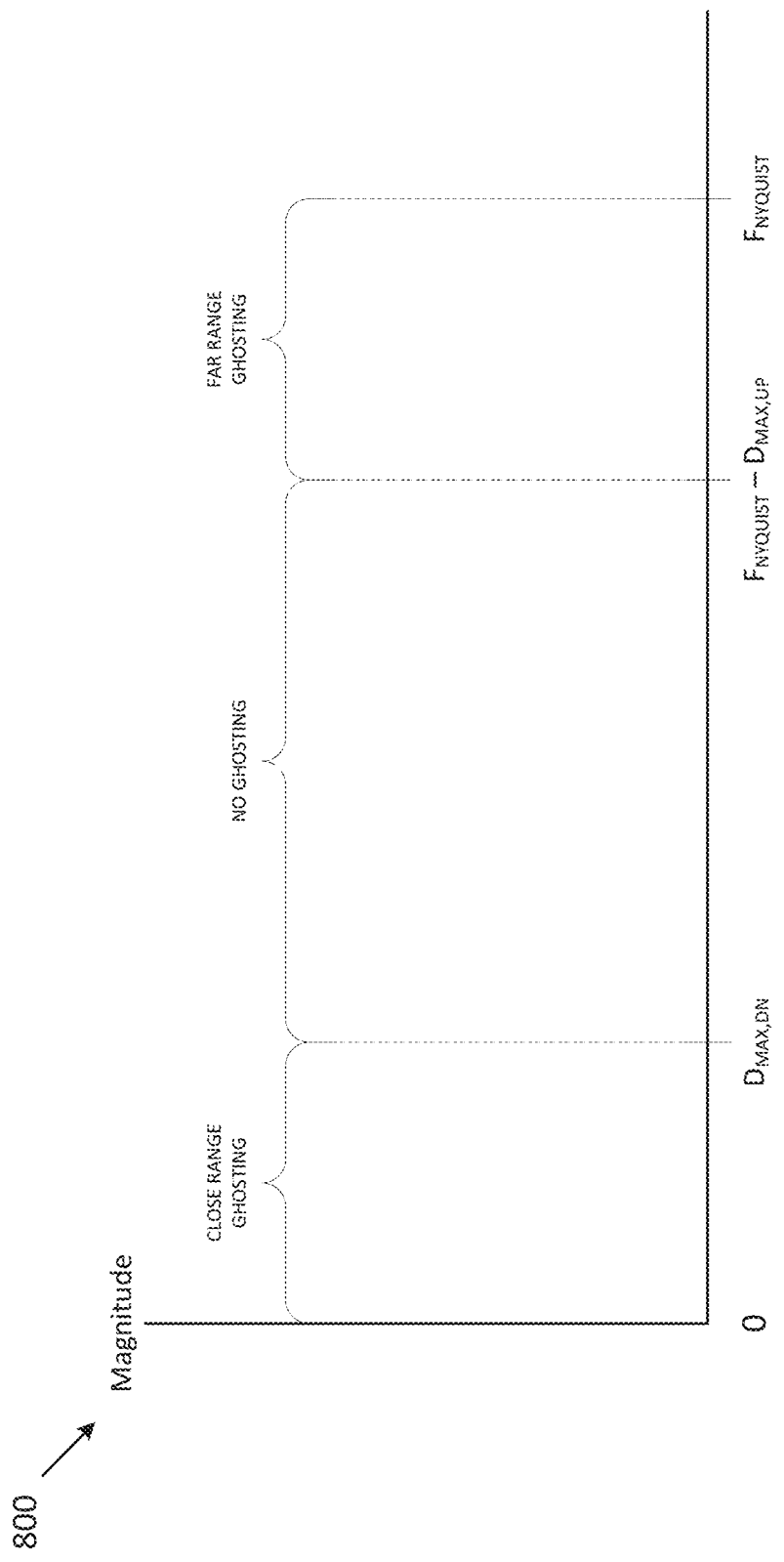
FIG. 8 is a signal magnitude-frequency diagram illustrating frequency ranges according to the present disclosure.

FIG. 8 is a signal magnitude-frequency diagram 800 illustrating frequency ranges according to the present disclosure. A frequency of 0 (e.g., 0 hertz, 0 terahertz, etc.) is illustrated in the signal magnitude-frequency diagram 800. Frequency $D_{MAX,DN}$ is also illustrated in the signal magnitude-frequency diagram 800. $D_{MAX,DN}$ may be a maximum or threshold negative Doppler shift (e.g., a Doppler shift that occurs when an object is moving away from the LIDAR system) that the LIDAR system may be able to account for when detecting objects. Signal magnitude-frequency diagram 800 also refers to $D_{MAX,UP}$. $D_{MAX,UP}$ may be a maximum or threshold positive Doppler shift (e.g., a Doppler shift that occurs when an object is moving towards from the LIDAR system) that the LIDAR system may be able to account for when detecting objects. The Nyquist frequency $F_{NYQUIST}$ is also illustrated in the signal magnitude-frequency diagram 800. In addition, the frequency $F_{NYQUIST}$-$D_{MAX,UP}$ is also illustrated in the signal magnitude-frequency diagram 800.

The range of frequencies between 0 and $D_{MAX,DN}$ may be a first range of frequencies where closer/close range ghosting may occur. The range of frequencies between $F_{NYQUIST}$-$D_{MAX,UP}$ and $F_{NYQUIST}$ may be a second range of frequencies where far range ghosting may occur. The range of frequencies between $D_{MAX,DN}$ and $F_{NYQUIST}$-$D_{MAX,UP}$ may be a third range of frequencies where ghosting may not occur.

To determine whether close/closer range or far range ghosting is occurring the FMCW LIDAR may analyze the peaks that are detected. In some embodiments, if a positive peak a first chirp/sweep is less than $D_{MAX,DN}$, and the positive peak the second chirp/sweep less than $2*D_{MAX,DN}$, close range ghosting mitigation may be applied. In other embodiments, if the positive peak of either the first chirp/sweep is greater than $F_{NYQUIST}$-$D_{MAX,UP}$, and the positive peak of the second chirp/sweep is greater than ($F_{NYQUIST}$—$(2*D_{MAX,UP})$), far range ghosting mitigation may be applied. In further embodiments, if both positive peaks are in the range ($D_{MAX,DN}$, $F_{NYQUIST}$-$D_{MAX,UP}$), no ghosting mitigation may need to be applied.

In some embodiments, instead of detecting peaks to determine whether closer or far range ghost mitigation should be used, the FMCW LIDAR may use energy detection. For example, peak detection may use more computational resources (e.g., processing resources, processing capacity, processing power) and/or memory. Peak detection may also take more time to perform. Detecting the total amount of energy (e.g., energy detection) within a range of frequencies, rather than detecting peaks may allow the FMCW LIDAR to determine which type of ghost mitigation should be used more quickly and/or efficiently.

Figure 9:
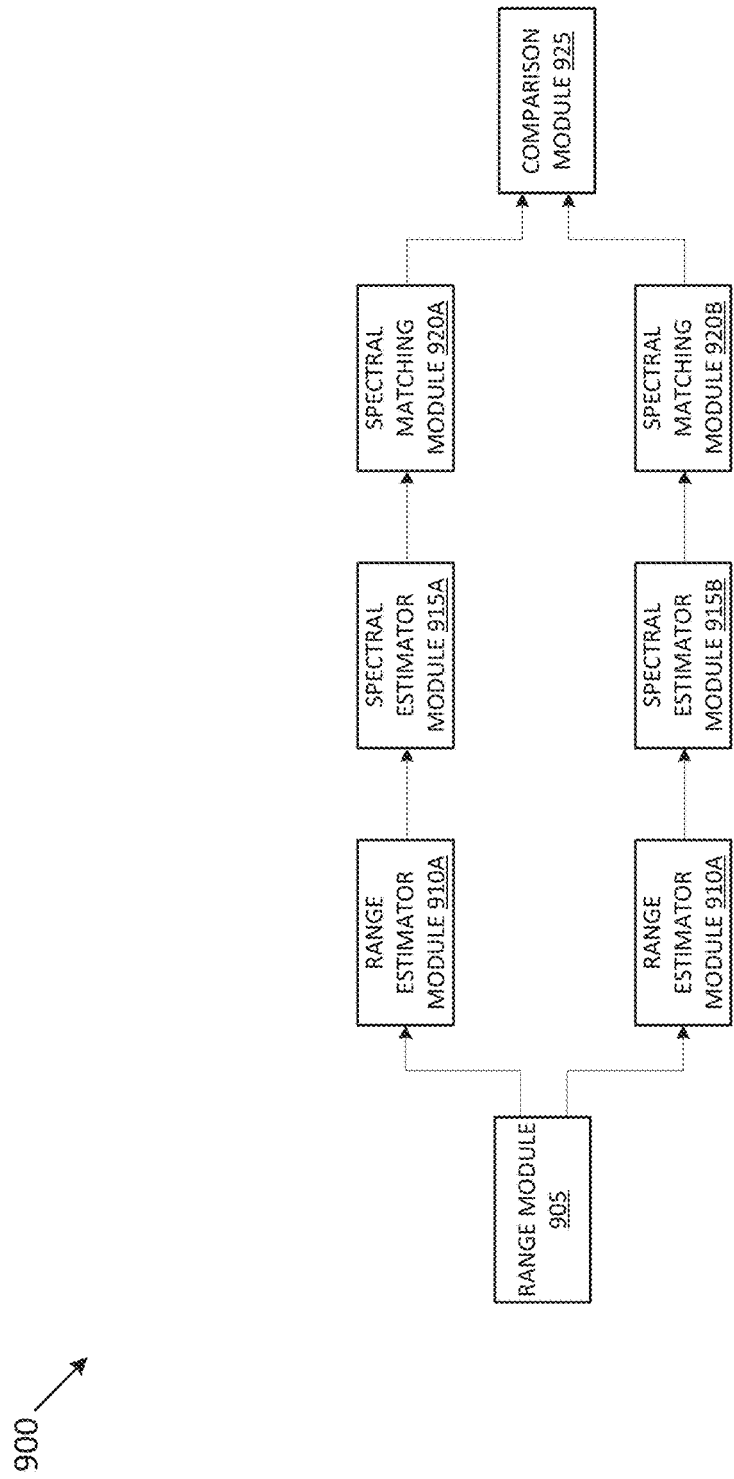
FIG. 9 is a block diagram of an example signal processing system for selecting peaks according to the present disclosure.

FIG. 9 is a block diagram of an example peak selector 900 for selecting (e.g., determining, picking, calculating, etc.) peaks according to the present disclosure. The peak selector 900 may be part of a signal processing system of a LIDAR system. For example, the peak selector 900 may be part of the signal processing system 303 of the LIDAR system 300, as illustrated in FIG. 3A and FIG. 4. In another example, the peak selector 900 may be part of signal processing unit 112 illustrated in FIG. 1. In particular, the peak selector 900 may be included in peak search processor 406 the signal processing system 303, as illustrated in FIG. 4. The peak selector includes a range module 905, range estimator modules 910A and 910B, spectral estimator modules 915A and 915B, spectral matching modules 920A and 920B, and a comparison module 925.

The range module 905 may be hardware, software, firmware, or a combination thereof. In one embodiment, the range module 905 may determine whether close or far ghosting is occurring (e.g., whether close or far range ghost mitigation should be applied) based on whether peaks detected by the LIDAR system are in different ranges of frequencies, as discussed above in FIG. 8. The range module 905 may perform peak detection or energy detection, as discussed above.

The range estimator modules 910A and 910B may be hardware, software, firmware, or a combination thereof. In one embodiment, the range estimator modules 910A and 910B may determine (e.g., calculate, generate, etc.) different range estimates for different peaks. For example, referring to FIG. 5, the range estimator module 910A may determine a range estimate for peak 510A and the range estimator module 910B may determine a range estimate for peak 510B.

The spectral estimator modules 915A and 915B may be hardware, software, firmware, or a combination thereof. In one embodiment, the spectral estimator modules 915A and 915B may determine (e.g., generate, calculate, etc.) different spectral estimates (e.g., different peak shapes) for different peaks. For example, referring to FIG. 5, the spectral estimator module 915A may determine a first spectral estimate 520 for peak 510A based on the first range estimate and the phase modulations in the chirp/sweep that is associated with the peak 510A. The spectral estimator module 915B may determine a first spectral estimate 525 for peak 510B based on the first range estimate and the phase modulations in the chirp/sweep that is associated with the peak 510B.

The spectral matching modules 920A and 920B may be hardware, software, firmware, or a combination thereof. In one embodiment, the spectral matching modules 920A and 920B may determine whether the spectral estimates (generated by spectral estimator modules 915A and 915B) match the shapes of the peaks detected by the LIDAR system. In some embodiments, the spectral matching modules 920A and 920B may use a correlation filter to pick the peak that better matches one of the spectral estimates. The peak with the higher correlation result is picked as the true peak. In other embodiments, the spectral matching modules 920A and 920B may use phase correction to select the peak that better matches one of the spectral estimates. The spectral estimates can be used to make the peaks taller and narrower by removing the phase modulation. The corrected peak that is taller or narrower may be selected.

In one embodiment, the spectral matching modules 920A and 920B may each output a match level to the comparison module 925. The match levels may be a metric, parameter, number, or some other value that indicates how closely the shape of a peak matches a spectral estimate. The comparison module 925 may select the peak that has the highest match level.

Figure 10:
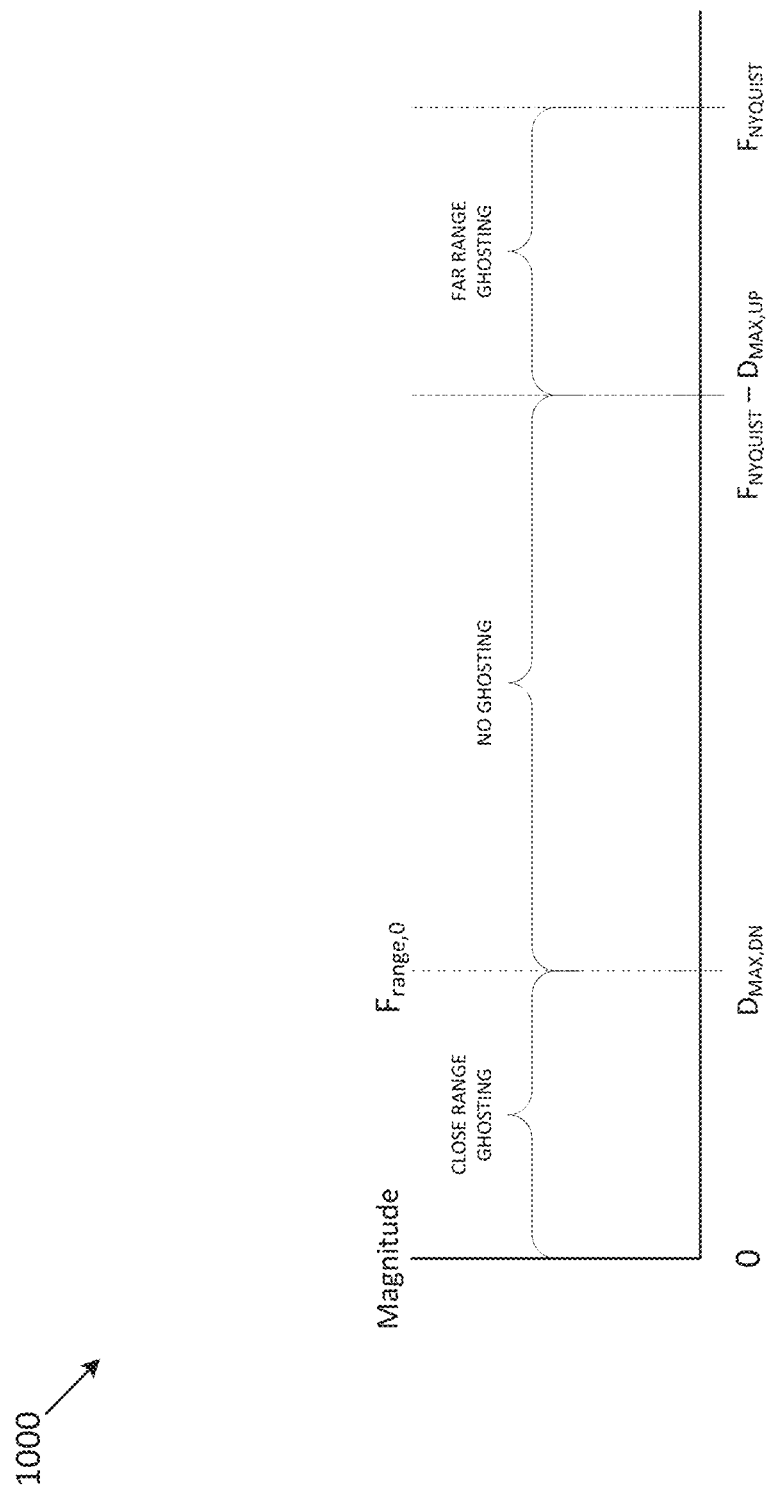
FIG. 10 is a signal magnitude-frequency diagram illustrating frequency ranges according to the present disclosure.

FIG. 10 is a signal magnitude-frequency diagram 1000 illustrating frequency ranges according to the present disclosure. A frequency of 0 (e.g., 0 hertz, 0 megahertz, 0 gigahertz, 0 terahertz, etc.) is illustrated in the signal magnitude-frequency diagram 1000. Frequency $D_{MAX,DN}$ is also illustrated in the signal magnitude-frequency diagram 1000. $D_{MAX,DN}$ may be a maximum or threshold negative Doppler shift that a LIDAR system (e.g., LIDAR system 100 illustrated in FIG. 1) may be able to account for when detecting objects. Signal magnitude-frequency diagram 1000 also refers to $D_{MAX,UP}$. $D_{MAX,UP}$ may be a maximum or threshold positive Doppler shift that the LIDAR system may be able to account for when detecting objects. The Nyquist frequency $F_{NYQUIST}$ is also illustrated in the signal magnitude-frequency diagram 1000. In addition, the frequency $F_{NYQUIST}-D_{MAX,UP}$ is also illustrated in the signal magnitude-frequency diagram 1000.

As discussed above, the range of frequencies between 0 and $D_{MAX,DN}$ may be a first range of frequencies where closer/close range ghosting may occur. The range of frequencies between $F_{NYQUIST}-D_{MAX,UP}$ and $F_{NYQUIST}$ may be a second range of frequencies where far range ghosting may occur. The range of frequencies between $D_{MAX}$ and $F_{NYQUIST}-D_{MAX}$ may be a third range of frequencies where ghosting may not occur.

In one embodiment, a delay may be included in the receive path of the LIDAR system. For example, referring to FIG. 3A, the signal processing unit 303 of the LIDAR system may activate a component within the optical processing system that may delay the baseband signal 314 that is provided to the signal processing system 303. With the delay in the receive path, the LIDAR system (e.g., the signal processing unit 112 illustrated in FIG. 1) may map a target that is at a range of zero (0) meters to the frequency $D_{MAX,DN}$. For example, the frequency (e.g., $F_{range,0}$) for an object that is located 0 meters from the LIDAR system (e.g., from the optical scanner 102 of the LIDAR system 100 illustrated in FIG. 1) may be mapped to the frequency $D_{MAX,DN}$. This may help ensure that frequency peaks for all targets will always be positive, even when the maximum negative Doppler shift occurs. By ensuring that the frequency peaks are always positive (even at the maximum negative Doppler shift), the LIDAR system may be able to reduce and/or eliminate the possibility of close range ghosting.

In one embodiment, mapping a target that is at a range of 0 meters to the frequency $D_{MAX,DN}$ may change the resolution (e.g., range resolution) of the LIDAR system. For example, because the total number of frequencies has been decreased (e.g., the frequencies between 0 and $D_{MAX,DN}$ are not used), the amount of distance represented by each frequency may increase (which may reduce the resolution of the LIDAR system). In another embodiment, the LIDAR system may have a threshold resolution (e.g., a maximum distance that may be represented by each frequency). The LIDAR system may not use a delay in the receive path (to map a target that is at a range of 0 meters to the frequency $D_{MAX,DN}$) if the resulting resolution of the LIDAR system is less than the threshold resolution. In a further embodiment, a LIDAR system may both map a target that is at the maximum range of the LIDAR system to the frequency $F_{NYQUIST}-D_{MAX,UP}$ and map a target that is at a range of 0 meters to the frequency $D_{MAX,DN}$.

In one embodiment, the LIDAR system (e.g., the signal processing unit 303 of the LIDAR system) may map a minimum distance threshold of the LIDAR system to the maximum negative Doppler shift threshold when a maximum negative Doppler shift threshold is set (e.g., configured) for the LIDAR system. The positive frequency value peaks among a first and second set of peaks (e.g., peaks 505A and 505B may be the first set of peaks, and peaks 510A and 510B may be the second set of peaks, as illustrated in FIG. 5) may be established, selected, identified, used, etc., as one or more true peaks to predict the target location. In another embodiment, the signal processing unit 303 may map the minimum distance threshold of the LIDAR system to the maximum negative Doppler shift threshold by adding an optical delay to the receive path of the LIDAR system to map the minimum distance threshold to a maximum negative Doppler shift frequency.

Figure 11:
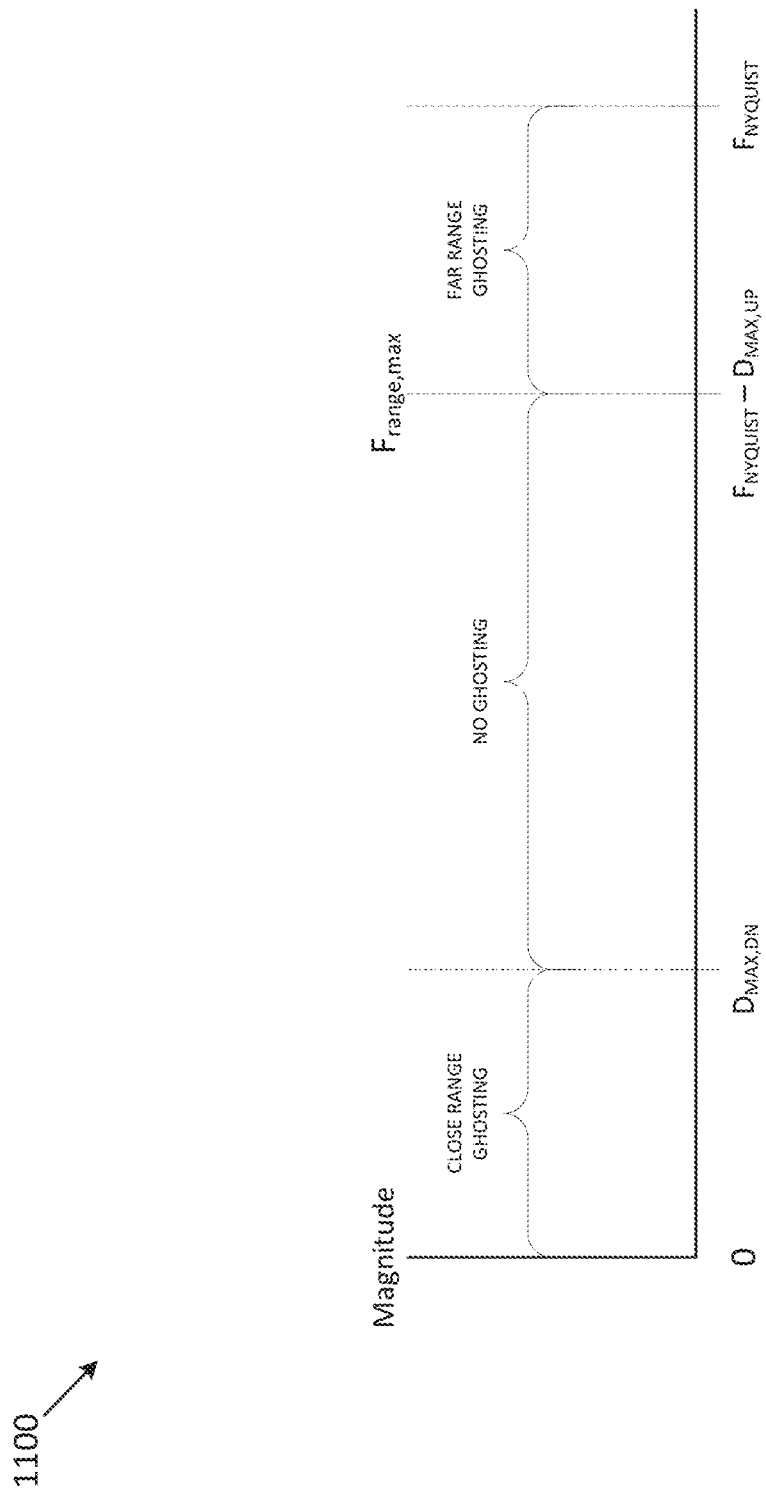
FIG. 11 is a signal magnitude-frequency diagram illustrating frequency ranges according to the present disclosure.

FIG. 11 is a signal magnitude-frequency diagram 1100 illustrating frequency ranges according to the present disclosure. A frequency of 0 (e.g., 0 hertz, 0 megahertz, 0 gigahertz, 0 terahertz, etc.) is illustrated in the signal magnitude-frequency diagram 1100. Frequency $D_{MAX,DN}$ is also illustrated in the signal magnitude-frequency diagram 1100. $D_{MAX,DN}$ may be a maximum or threshold negative Doppler shift that a LIDAR system (e.g., LIDAR system 100 illustrated in FIG. 1) may be able to account for when detecting objects. Signal magnitude-frequency diagram 1100 also refers to $D_{MAX,UP}$. $D_{MAX,UP}$ may be a maximum or threshold positive Doppler shift that the LIDAR system may be able to account for when detecting objects. The Nyquist frequency $F_{NYQUIST}$ is also illustrated in the signal magnitude-frequency diagram 1100. In addition, the frequency $F_{NYQUIST}$-$D_{MAX,UP}$ is also illustrated in the signal magnitude-frequency diagram 1100.

As discussed above, the range of frequencies between 0 and $D_{MAX,DN}$ may be a first range of frequencies where closer/close range ghosting may occur. The range of frequencies between $F_{NYQUIST}$-$D_{MAX,UP}$ and $F_{NYQUIST}$ may be a second range of frequencies where far range ghosting may occur. The range of frequencies between $D_{MAX}$ and $F_{NYQUIST}$-$D_{MAX}$ may be a third range of frequencies where ghosting may not occur.

In one embodiment, the rate at which the frequency of a chirp (e.g., the chirp rate of an up-chirp or down-chirp) increases/decreases may be adjusted, modified, changed, tuned, etc. For example, referring to FIG. 1, the signal processing unit 112 may instruct the optical scanner 102 to modify the rate at which the frequency of an up-chirp and a down-chirp changes. By changing (e.g., modifying, adjusting, etc.) the rate at which the frequency (e.g., chirp rate) of the chirp increases/decreases, the LIDAR system (e.g., the signal processing unit 112 illustrated in FIG. 1) may map a target that is at the maximum range of the LIDAR system to the frequency $F_{NYQUIST}$-$D_{MAX,UP}$. For example, the frequency (e.g., $F_{range,max}$) for an object that is located at the maximum range of the LIDAR system (which may vary in different embodiments) may be mapped to the frequency $F_{NYQUIST}$-$D_{MAX,UP}$. This may help ensure that frequency peaks for all targets do not increase past $F_{NYQUIST}$ due to positive Doppler shift. By ensuring that the frequency peaks do not increase past $F_{NYQUIST}$, the LIDAR system may be able to reduce and/or eliminate the possibility of far-range ghosting.

In one embodiment, a target that is at the maximum range of the LIDAR system to the frequency $F_{NYQUIST}$-$D_{MAX,UP}$ may change the resolution (e.g., range resolution) of the LIDAR system. For example, because the total number of frequencies has been decreased (e.g., the frequencies between $F_{NYQUIST}$-$D_{MAX,UP}$ and $F_{NYQUIST}$ are not used), the amount of distance represented by each frequency may increase (which may reduce the resolution of the LIDAR system). In another embodiment, the LIDAR system may have a threshold resolution (e.g., a maximum distance that may be represented by each frequency). The LIDAR system may adjust the rate at which a frequency of a chirp changes (to map a target that is at the maximum range of the LIDAR system to the frequency $F_{NYQUIST}$-$D_{MAX,UP}$) if the resulting resolution of the LIDAR system is less than the threshold resolution. In a further embodiment, a LIDAR system may both map a target that is at the maximum range of the LIDAR system to the frequency $F_{NYQUIST}$-$D_{MAX,UP}$ and map a target that is at a range of 0 meters to the frequency $D_{MAX,DN}$.

In one embodiment, the LIDAR system (e.g., signal processing unit 112) may map a maximum distance threshold of the LIDAR system to the maximum positive Doppler shift threshold to adjust a chirp rate of one or more optical beams, if the maximum positive Doppler shift threshold is set (e.g., configured) for the LIDAR system. Adjusting the chirp of the optical beams may prevent (or help prevent) aliasing of one or more peaks such that positive frequency value peaks among both the first and second set of peaks are established as one or more true peaks to predict the target location. In another embodiment, the signal processing unit 112 may map the maximum distance threshold by adjusting the chirp rate of the one or more optical beams based on the Nyquist frequency and the maximum distance threshold.

Figure 12:
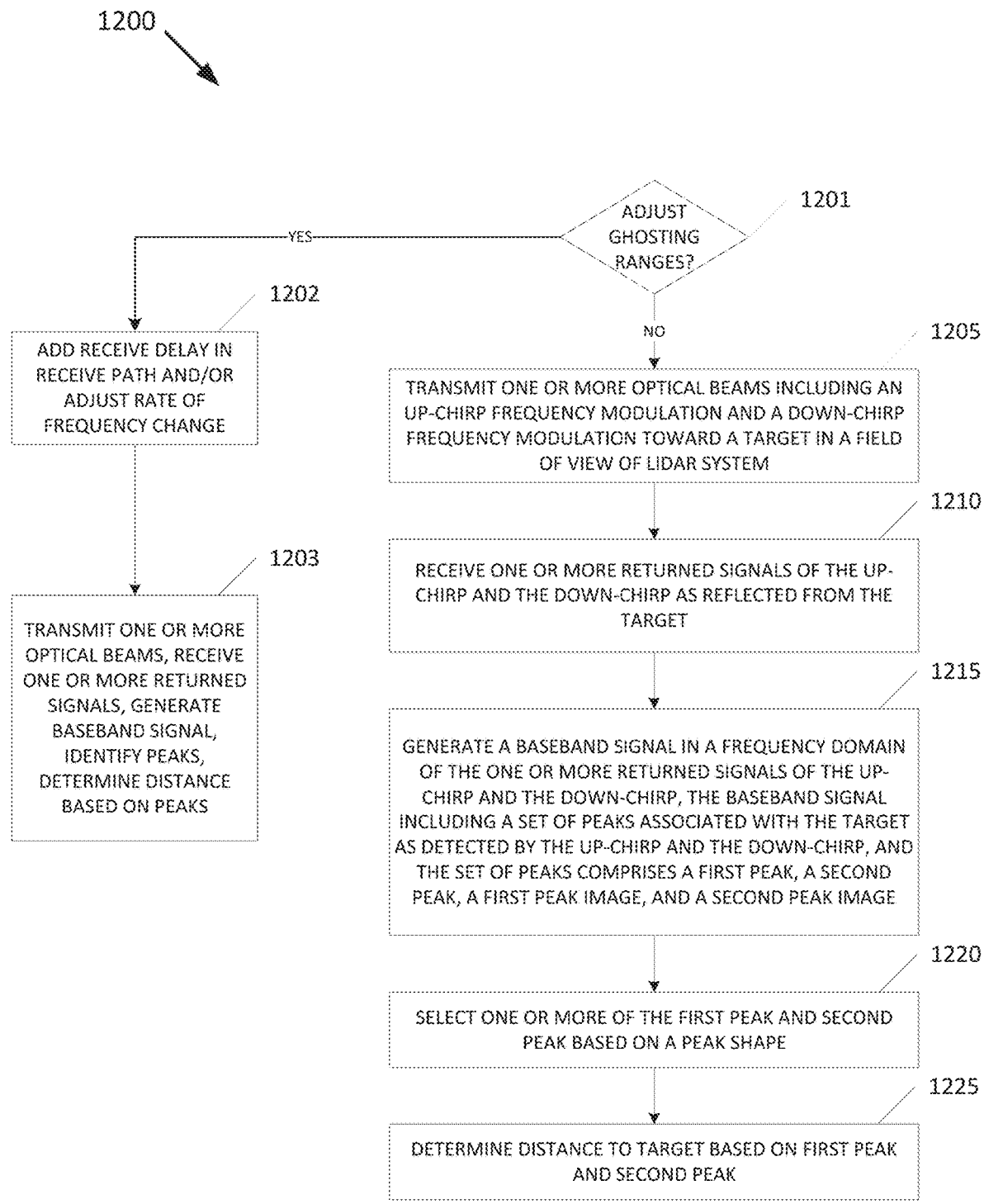
FIG. 12 is a flowchart illustrating a method for selecting peaks according to the present disclosure.

FIG. 12 is a flowchart illustrating a method 1200 in a LIDAR system, such as LIDAR system 100 or LIDAR system 300, for selecting peaks according to the present disclosure. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1200 may be performed by a signal processing system of a LIDAR system (e.g., the signal processing system 303 of the LIDAR system 300, as illustrated in FIG. 3A and FIG. 4).

Method 1200 begins at operation 1201 where the processing logic determines whether one or more ghosting ranges should be adjusted. For example, referring to FIGS. 10A, 10B, 11A, and 11B, the processing logic may determine whether close range ghosting and/or far-range ghosting may be reduced or eliminated based on a threshold resolution. If one or more ghosting ranges may be adjusted, the processing logic may add a receive delay and/or adjust a rate of change in the frequency of an up-chirp and/or down-chirp at operation 1202. For example, if the resolution of the LIDAR system is less than the threshold resolution, the processing may add a receive delay and/or adjust a rate of change in the frequency of an up-chirp and/or down-chirp. The processing logic may transmit one or more optical beams comprising an up-chirp frequency modulation and a down-chirp frequency modulation toward a target in a field of view of a light detection and ranging (LIDAR) system, receive one or more returned signals, generate a baseband signal, identify peaks in the baseband signal, and determine a distance to a target based on the peaks at operation 1203. For example, the processing logic may select the two highest peaks in the baseband signal and use the two highest peaks to determine the distance to the target.

If the ghosting ranges should not be adjusted, the method 1200 proceeds to operation 1205 where the processing logic transmits one or more optical beams comprising an up-chirp frequency modulation and a down-chirp frequency modulation toward a target in a field of view of a light detection and ranging (LIDAR) system. Optionally, the processing logic may introduce phase modulations into the one or more optical beams. At operation 1210, the processing logic receives one or more returned signals of the up-chirp and the down-chirp as reflected from the target.

At operation 1215, the processing logic generates a baseband signal in a frequency domain of the one or more returned signals of the up-chirp and the down-chirp, the baseband signal comprising a set of peaks associated with the target as detected by the up-chirp and the down-chirp, wherein the set of peaks comprises a first peak, a second peak, a first peak image, and a second peak image. For example, the set of peaks may include the peaks and/or peak images illustrated in FIG. 5 and FIG. 6.

At operation 1220, processing logic selects one or more of the first peak and second peak based on a peak shape. For example, the processing logic may determine a first frequency range, a second frequency range, and a third frequency range, based on a threshold (e.g., a maximum) Doppler shift for the LIDAR system. The processing logic may determine a frequency range (e.g., which one of the first frequency range, the second frequency range, and the third frequency range) for each of the peaks. Based on whether the peaks are located in the first frequency range, the second frequency range, and the third frequency range, the processing logic may determine whether peak with the highest frequency should be selected as the first peak, or whether a third peak should be determined (e.g., calculated, determined, etc.) and used as the first peak. For example, if closer/close range ghosting is occurring because the peak is in the first frequency range, the processing logic may select the peak with the highest frequency. If far range ghosting is occurring because the peak is in the second frequency range, the processing logic may calculate a new peak based on the first peak (e.g., a Nyquist image), as discussed above. The processing logic may also select the second peak based on a peak shape. For example, the processing logic may determine one or more spectral shapes (as discussed above) and may compare the one or more spectral shapes with the shapes of the peaks in the set of peaks, to select the second peak from the set of peaks.

At operation 1225, the processing logic determines a distance to a target based on the first peak and the second peak. For example, the distance to the target may be determined by taking the sum of the frequencies of the first peak, the second peak, and divided by 2.

Figure 13:
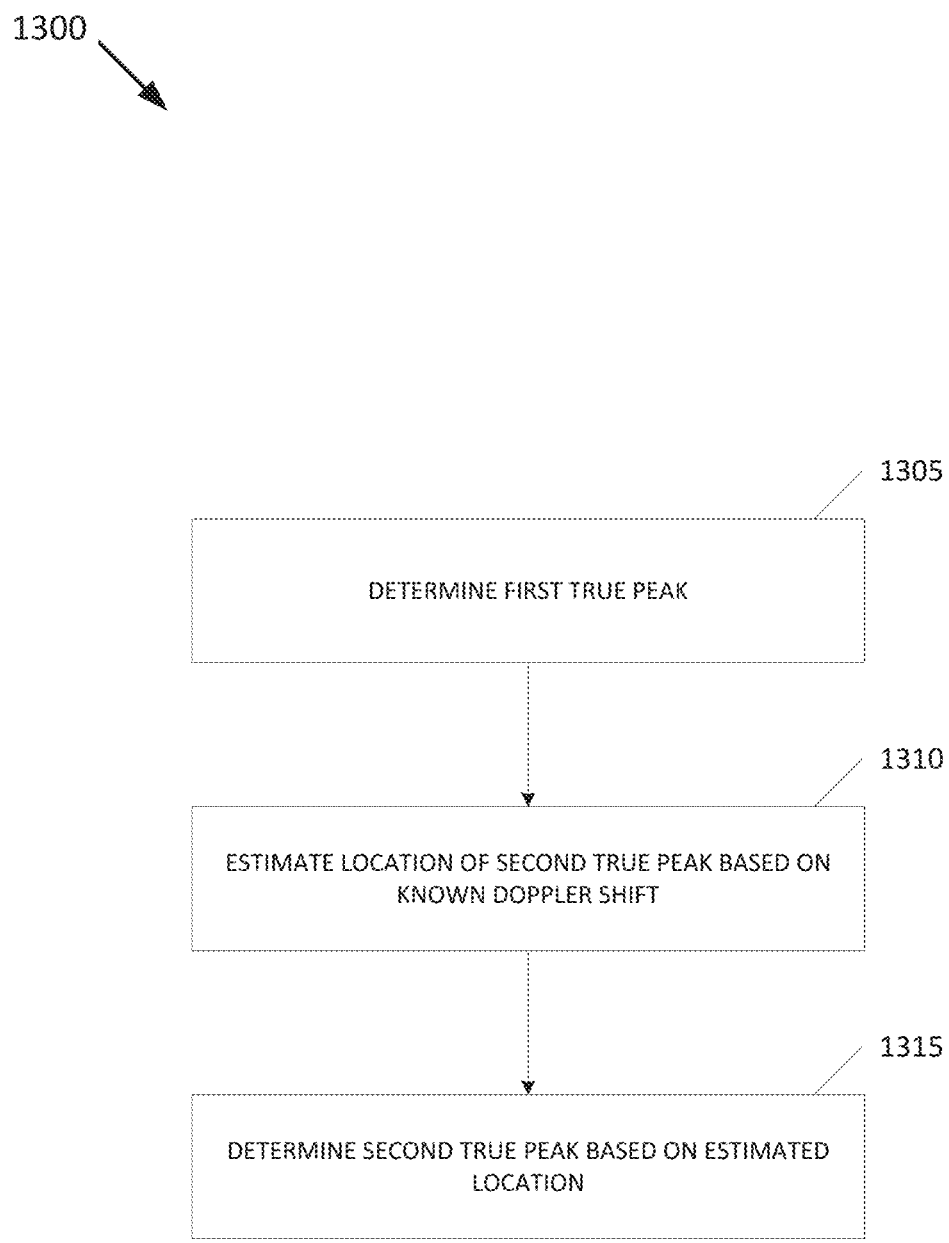
FIG. 13 is a flowchart illustrating a method for selecting peaks according to the present disclosure.

FIG. 13 is a flowchart illustrating a method 1300 in a LIDAR system, such as LIDAR system 100 or LIDAR system 300, for selecting peaks according to the present disclosure. Method 1300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1300 may be performed by a signal processing system of a LIDAR system (e.g., the signal processing system 303 of the LIDAR system 300, as illustrated in FIG. 3A and FIG. 4).

In one embodiment, the method 1300 may be performed if the total Doppler shift (e.g., the relative velocity between the LIDAR system or a sensor of the LIDAR system and the target) is known. The processing logic may determine or estimate the total Doppler shift (D) using various techniques. For example, the processing logic may determine the total Doppler shift by estimating or determining the ego-velocity. The ego-velocity may be used when the target is static or not moving. In another example, the processing logic may use information/data from a previous frame. For each point in a point cloud (e.g., a 3D point cloud), the processing logic may assume that the Doppler shift is the same as at the same point in the previous frame. In a further example, the processing logic may use information/data from neighboring points. If the Doppler shift of the previous N points that were in the neighborhood of the current point had a small variance, the Doppler shift of the current point may be equal to the mean or median of that of its neighbors.

If the total Doppler shift is known, the processing logic may pick a first true peak (e.g., a guaranteed true peak) at operation 1305. If close-range ghosting is occurring, then the first true peak $F_{true1}$ may be determine as $F_{true1}=F_{up}$ (e.g., an upshifted peak). If far-range ghosting is occurring, then the first true peak $F_{true1}$ may be determine as $F_{true}=F_{dn}$ (e.g., a downshifted peak).

At operation 1310, the processing logic may estimate the location of the other true peak using the known Doppler shift. If close-range ghosting is occurring, the estimated location of the other true peak $\hat{F}_{dn}$ may be determined as $\hat{F}_{dn}=F_{up}-2*D$. If far-range ghosting is occurring, the estimated location of the other true peak $\hat{F}_{up}$ may be determined as $\hat{F}_{up}=2*F_{Nyquist}-(F_{dn}+2*D)$.

The processing logic may select a peak that is within a threshold, tolerance, etc., of the estimated location (e.g., estimated peak location) as the second true peak at block 1315. For example, if close-range ghosting is occurring, the processing logic may select a peak that is within a threshold of $\hat{F}_{dn}$. In another example, if far-range ghosting is occurring, the processing logic may select a peak that is within a threshold of $\hat{F}_{up}$.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    transmitting, toward a target in a field of view of a light detection and ranging (LIDAR) system, one or more optical beams comprising at least one up-chirp frequency and at least one down-chirp frequency, wherein the one or more optical beams are modulated to have phase non-linearities;
    receiving, from the target, one or more returned signals based on the one or more optical beams, wherein the one or more returned signals comprises an adjusted up-chirp frequency shifted from the at least one up-chirp frequency caused by a relative motion of at least one of the target and the LIDAR system, and an adjusted down-chirp frequency shifted from the at least one down-chirp frequency caused by the relative motion of at least one of the target and the LIDAR system, the adjusted up-chirp frequency and the adjusted down-chirp frequency producing a first set of peaks associated with the at least one up-chirp frequency corresponding to a target location of the target and a second set of peaks associated with the at least one down-chirp frequency corresponding to the target location; and
    determining the target location using the first set of peaks and the second set of peaks based at least in part on shapes of the first set of peaks and the second set of peaks caused by the phase non-linearities in the one or more optical beams.

2. The method of claim 1, wherein determining the target location further comprises:
    calculating a first set of frequency bins surrounding a first peak associated with the first set of peaks;
    calculating a second set of frequency bins surrounding a second peak associated with the first set of peaks based on the second set of frequency bins comprising negative frequency values that correspond to positive frequency values associated with the first set of frequency bins, wherein the second peak is conjugate symmetric to the first peak;
    calculating a third set of frequency bins surrounding a third peak associated with the second set of peaks;
    calculating a fourth set of frequency bins surrounding a fourth peak associated with the second set of peaks based on a fourth set of frequency bins comprising negative frequency values that correspond to positive frequency values associated with the third set of frequency bins, wherein the fourth peak is conjugate symmetric to the third peak.

3. The method of claim 2, further comprising:
    provided the first peak or the third peak is within a maximum Doppler shift relative to a minimum detectable frequency set for the LIDAR system:
    selecting, from the first peak and the third peak, a true peak value corresponding to the target location based on a highest frequency comprising a positive frequency value;
    provided the first peak is the true peak value:
        computing a first target range estimate based on the first peak and the third peak and using the first target range estimate and phase non-linearities in the one or more optical beams to determine a first peak shape estimate;
        computing a second target range estimate based on the first peak and the fourth peak and using the second target range estimate and the phase non-linearities to determine a second peak shape estimate;
        comparing the first peak shape estimate and the second peak shape estimate to the third peak and the fourth peak;
        provided the first peak shape estimate and the third peak produce a higher correlation than the second peak shape estimate and the fourth peak, determining the third peak to correspond to the target location; and
        provided the second peak shape estimate and the fourth peak produce a higher correlation than the first peak shape estimate and the third peak, determining the fourth peak to correspond to the target location.

4. The method of claim 3, further comprising:
    provided the third peak is the true peak value:
        computing a first target range estimate based on the first peak and the third peak and using the first target range estimate and phase non-linearities in the one or more optical beams to determine a third peak shape estimate;
        computing a second target range estimate based on the second peak and the third peak and using the second target range estimate and the phase non-linearities to determine a fourth peak shape estimate;
        comparing the third peak shape estimate and the fourth peak shape estimate to the first peak and the second peak;
        provided the third peak shape estimate and the first peak produce a higher correlation than the fourth peak shape estimate and the second peak, determining the first peak to correspond to the target location; and
        provided the fourth peak shape estimate and the second peak produce a higher correlation than the third peak shape estimate and the first peak, determining the second peak to correspond to the target location.

5. The method of claim 3, wherein comparing the first peak shape estimate and the second peak shape estimate further comprises: comparing the first peak shape estimate to the third peak and comparing the second peak shape estimate to the fourth peak.

6. The method of claim 3, wherein provided the first peak shape estimate matches the third peak further comprises: correlating the first peak shape estimate and the third peak to produce a correlation and determining whether the correlation exceeds a predetermined threshold.

7. The method of claim 2, further comprising:
provided the first peak or the third peak is within a maximum Doppler shift relative to a Nyquist frequency:
  selecting, from the first peak and the third peak, a true peak value corresponding to the target location based on a lowest frequency comprising a positive frequency value;
  provided the first peak is the true peak value:
    computing a first target range estimate based on the first peak and the third peak and using the first target range estimate and phase non-linearities in the one or more optical beams to determine a first peak shape estimate;
    computing a second target range estimate based on the first peak and the fourth peak and using the second target range estimate and the phase non-linearities to determine a second peak shape estimate;
    comparing the first peak shape estimate and the second peak shape estimate to the third peak and the fourth peak respectively;
    provided the first peak shape estimate and the third peak produce a higher correlation than the second peak shape estimate and the fourth peak, determining the third peak to correspond to the target location; and
    provided the second peak shape estimate and the fourth peak produce a higher correlation than the first peak shape estimate and the third peak, determining the fourth peak to correspond to the target location, wherein the true peak is set to a combination of the Nyquist frequency and a frequency corresponding to the fourth peak.

8. The method of claim 1, further comprising:
provided a maximum negative Doppler shift threshold is set for the LIDAR system:
  mapping a minimum distance threshold of the LIDAR system to the maximum negative Doppler shift threshold wherein positive frequency value peaks among the first and second set of peaks are established as one or more true peaks to predict the target location.

9. The method of claim 8, wherein mapping a minimum distance further comprises:
adding an optical delay to a receive path of the LIDAR system to map the minimum distance threshold to a maximum negative Doppler shift frequency.

10. The method of claim 8, further comprising:
provided a Doppler shift between the LIDAR system and the target is predetermined:
selecting a true peak corresponding to the target location based on the first set of peaks.

11. The method of claim 8, further comprising:
provided a maximum positive Doppler shift threshold is set for the LIDAR system:
  mapping a maximum distance threshold of the LIDAR system to the maximum positive Doppler shift threshold to adjust a chirp rate of one or more optical beams to prevent aliasing of one or more peaks such that positive frequency value peaks among both the first and second set of peaks are established as one or more true peaks to predict the target location.

12. The method of claim 10, wherein mapping a maximum distance threshold further comprises:
  adjusting a chirp rate of one or more optical beams based on a Nyquist frequency and the maximum distance threshold.

13. The method of claim 2, further comprising:
provided the first peak or the third peak is within a maximum Doppler shift relative to a minimum detectable frequency set for the Lidar system:
  provided a Doppler shift between the LIDAR system and the target is predetermined producing a predetermined Doppler shift:
  selecting, from the first peak and the third peak, a first true peak location corresponding to the target location based on a highest frequency comprising a positive frequency value;
  provided the first peak is selected as the first true peak location:
  estimating a second true peak location based on the predetermined Doppler shift and the first peak; and
  determining a target location based on a selection between the third peak and the fourth peak based on a proximity with the second true peak location;
  provided the third peak is selected as the first true peak location:
  estimating the second true peak location based on the predetermined Doppler shift and the third peak; and
  determining a target location based on a selection between the second peak and the first peak based on a proximity with the second true peak location.

14. The method of claim 13, wherein the predetermined Doppler shift is selected based on at least one of ego-velocity, previous frame information, and neighboring points information.

15. The method of claim 1, further comprising:
provided the first peak or the third peak is within a maximum Doppler shift relative to a Nyquist frequency:
  provided a Doppler shift between the LIDAR system and the target is predetermined producing a predetermined Doppler shift:
  selecting, from the first peak and the third peak, a first true peak location corresponding to the target location based on a lowest frequency comprising a positive frequency value;
  provided the first peak is selected as the first true peak location:
  estimating a second true peak location based on the predetermined Doppler shift, the first peak, and a Nyquist frequency; and
  determining a target location based on a selection between the third peak and the fourth peak based on a proximity with the second true peak location;
  provided the third peak is selected as the first true peak location:
  estimating the second true peak location based on the predetermined Doppler shift and the third peak, and the Nyquist frequency; and
  determining the target location based on the selection between the second peak and the first peak based on a proximity with the second true peak location.

16. The method of claim 15, wherein the predetermined Doppler shift is selected based on at least one of ego-velocity, previous frame information, and neighboring points information.

17. The method of claim 1, further comprising:
generating a baseband signal in a frequency domain by mixing the at least one up-chirp frequency and the at least one down-chirp frequency with the one or more returned signals, wherein the at least one down-chirp frequency is delayed in time proportional to the relative motion.

18. The method of claim 17, wherein the baseband signal comprises the first set of peaks and the second set of peaks.

19. A light detection and ranging (LIDAR) system, comprising:
an optical scanner to transmit one or more optical beams comprising at least one up-chirp frequency and at least one down-chirp frequency toward targets in a field of view of the LIDAR system and receive one or more returned signals based on the one or more optical beams, wherein the one or more optical beams are modulated to have phase non-linearities, wherein the one or more returned signals comprises an adjusted up-chirp frequency shifted from the at least one up-chirp frequency caused by a relative motion of at least one of the target and the LIDAR system, and an adjusted down-chirp frequency shifted from the at least one down-chirp frequency caused by the relative motion of at least one of the target and the LIDAR system, the adjusted up-chirp frequency and the adjusted down-chirp frequency producing a first set of peaks associated with the at least one up-chirp frequency corresponding to a target location of the target and a second set of peaks associated with the at least one down-chirp frequency corresponding to the target location;
an optical processing system coupled to the optical scanner to generate a baseband signal in a time domain from the return signal, the baseband signal comprising frequencies corresponding to LIDAR target ranges; and
a signal processing system coupled to the optical processing system, comprising:
a processing device; and
a memory to store instructions that, when executed by the processing device, cause the LIDAR system to:
determine the target location using the first set of peaks and the second set of peaks based at least in part on shapes of the first set of peaks and the second set of peaks caused by the phase non-linearities in the one or more optical beams.

20. A non-transitory computer-readable medium containing instructions that, when executed by a processor in a (light detection and ranging) LIDAR system, cause the LIDAR system to:
transmit, toward a target in a field of view of the LIDAR system, one or more optical beams comprising at least one up-chirp frequency and at least one down-chirp frequency, wherein the one or more optical beams are modulated to have phase non-linearities;
receive, from the target, one or more returned signals based on the one or more optical beams, wherein the one or more returned signals comprises an adjusted up-chirp frequency shifted from the at least one up-chirp frequency caused by a relative motion of at least one of the target and the LIDAR system, and an adjusted down-chirp frequency shifted from the at least one down-chirp frequency caused by the relative motion of at least one of the target and the LIDAR system, the adjusted up-chirp frequency and the adjusted down-chirp frequency producing a first set of peaks associated with the at least one up-chirp frequency corresponding to a target location of the target and a second set of peaks associated with the at least one down-chirp frequency corresponding to the target location; and
determine the target location using the first set of peaks and the second set of peaks based at least in part on shapes of the first set of peaks and the second set of peaks caused by the phase non-linearities in the one or more optical beams.

* * * * *